United States Patent
Kilshaw et al.

(10) Patent No.: US 9,977,145 B2
(45) Date of Patent: May 22, 2018

(54) SYSTEM AND METHOD FOR WELLBORE SURVEYING USING DIRECTIONAL GAMMA DETECTION

(71) Applicant: Gyrodata, Incorporated, Houston, TX (US)

(72) Inventors: Nigel John Dennis Kilshaw, Cumbria (GB); Donald Ian Carruthers, Cumbria (GB); Peter Allen, Cumbria (GB); Walter Edward Somerville Davey, Cambridge (GB)

(73) Assignee: Gyrodata, Incorporated, Houston, TX (US)

( * ) Notice: Subject to any disclaimer, the term of this patent is extended or adjusted under 35 U.S.C. 154(b) by 102 days.

(21) Appl. No.: 14/832,903

(22) Filed: Aug. 21, 2015

(65) Prior Publication Data

US 2017/0052275 A1    Feb. 23, 2017

(51) Int. Cl.
*G01V 5/12* (2006.01)
*G01V 5/06* (2006.01)

(52) U.S. Cl.
CPC . *G01V 5/12* (2013.01); *G01V 5/06* (2013.01)

(58) Field of Classification Search
CPC .................................. G01V 5/12; G01V 5/06
See application file for complete search history.

(56) References Cited

U.S. PATENT DOCUMENTS

| 6,781,115 B2 * | 8/2004 | Stoller | G01V 5/04 250/266 |
| 2013/0261974 A1 * | 10/2013 | Stewart | G01V 5/125 702/8 |

\* cited by examiner

*Primary Examiner* — David Porta
*Assistant Examiner* — Mindy Vu
(74) *Attorney, Agent, or Firm* — Pramudji Law Group PLLC; Ari Pramudji

(57) ABSTRACT

A wellbore survey tool and methods for estimating a direction of highest gamma ray intensity of a gamma ray distribution are provided. The tool includes a body having a center axis. The body is configured to be placed within a wellbore. The tool further includes a plurality of gamma ray detectors within the body. Each detector of the plurality of gamma ray detectors has a direction of maximum gamma ray sensitivity with the direction having a non-zero component perpendicular to the center axis. The non-zero components of the plurality of gamma ray detectors are spaced circumferentially about the center axis.

14 Claims, 20 Drawing Sheets

Roll angle

SYSTEM AND METHOD FOR WELLBORE SURVEYING USING DIRECTIONAL GAMMA DETECTION

BACKGROUND

Field

This application relates generally to wellbore surveying and, more particularly, to systems and methods for determining the position of a wellbore relative to underground formations for oil field and gas field exploration and development.

Description of the Related Art

A survey tool configured to be used in a wellbore can comprise one or more sensors that are configured to provide information indicative of a position, orientation, or both of the survey tool relative to the Earth. For example, the survey tool can comprise at least one accelerometer sensor configured to provide at least one data signal indicative of the orientation of the survey tool relative to the center of the Earth. For another example, the survey tool can comprise at least one magnetic sensor configured to provide at least one data signal indicative of the orientation of the survey tool relative to the magnetic field of the Earth. For still another example, the survey tool can comprise at least one gyroscopic sensor configured to provide at least one data signal indicative of the orientation of the survey tool relative to the rotation axis of the Earth. The at least one gyroscopic sensor can comprise a rate gyroscope (e.g., a spinning gyroscope, typically with the spin axis substantially parallel to the wellbore) which undergoes precession as a consequence of the Earth's rotation and which can detect the components of this precession and generate information indicative of the orientation of the rate gyroscope's spin axis relative to the Earth's axis of rotation (e.g., information indicative to the orientation of the survey tool relative to true north).

As a wellbore is drilled in accordance with the well plan, further geological data can be collected using logging sensors, e.g., which provide measurements of gamma ray radiation or formation resistivity. These data are used to update knowledge of the geological formation and adjust the wellbore trajectory via a process known as geo-steering. This process can be applied to enable a desired geological target to be reached or to ensure that the wellbore remains within a desired hydro-carbon-bearing rock formation.

SUMMARY

One aspect provided by certain embodiments described herein is a wellbore survey tool. The tool comprises a body having a center axis. The body is configured to be placed within a wellbore. The tool further comprises a plurality of gamma ray detectors within the body. Each detector of the plurality of gamma ray detectors has a direction of maximum gamma ray sensitivity with the direction having a non-zero component perpendicular to the center axis. The non-zero components of the plurality of gamma ray detectors are spaced circumferentially about the center axis.

Another aspect provided by certain embodiments described herein is a method comprising receiving signals from a wellbore survey tool within a wellbore. The tool comprises a center axis and a plurality of gamma ray detectors. Each detector of the plurality of gamma ray detectors has a direction of maximum gamma ray sensitivity with the direction having a non-zero component perpendicular to the center axis. The non-zero components of the plurality of gamma ray detectors are spaced circumferentially about the center axis. The signals are indicative of a gamma ray detection level of each detector of the plurality of gamma ray detectors. The method further comprises estimating, in response to at least some of the received signals, a direction of highest gamma ray intensity of a gamma ray distribution detected by the plurality of gamma ray detectors.

Another aspect provided by certain embodiments described herein is a method comprising receiving signals from a wellbore survey tool within a wellbore. The tool comprises a center axis and one or more gamma ray detectors each having a direction of maximum gamma ray sensitivity with the direction having a non-zero component perpendicular to the center axis. The signals are indicative of gamma ray detection levels of the one or more gamma ray detectors. The method further comprises calculating, in response to the at least some of the received signals, a circle approximating an estimated set of gamma ray detection levels expected from the one or more gamma ray detectors during a hypothetical rotation of the tool about the center axis while the tool is substantially stationary in a direction along the wellbore.

BRIEF DESCRIPTION OF THE DRAWINGS

Various configurations are depicted in the accompanying drawings for illustrative purposes, and should in no way be interpreted as limiting the scope of the systems or methods described herein. In addition, various features of different disclosed configurations can be combined with one another to form additional configurations, which are part of this disclosure. Any feature or structure can be removed, altered, or omitted. Throughout the drawings, reference numbers may be reused to indicate correspondence between reference elements.

FIGS. 8A and 8B schematically illustrate two example comparisons between data measured from a conventional eight-sector azimuthal gamma ray tool and the values predicted using a tool comprising three detectors in accordance with certain embodiments described herein.

DETAILED DESCRIPTION

Figure 1A:
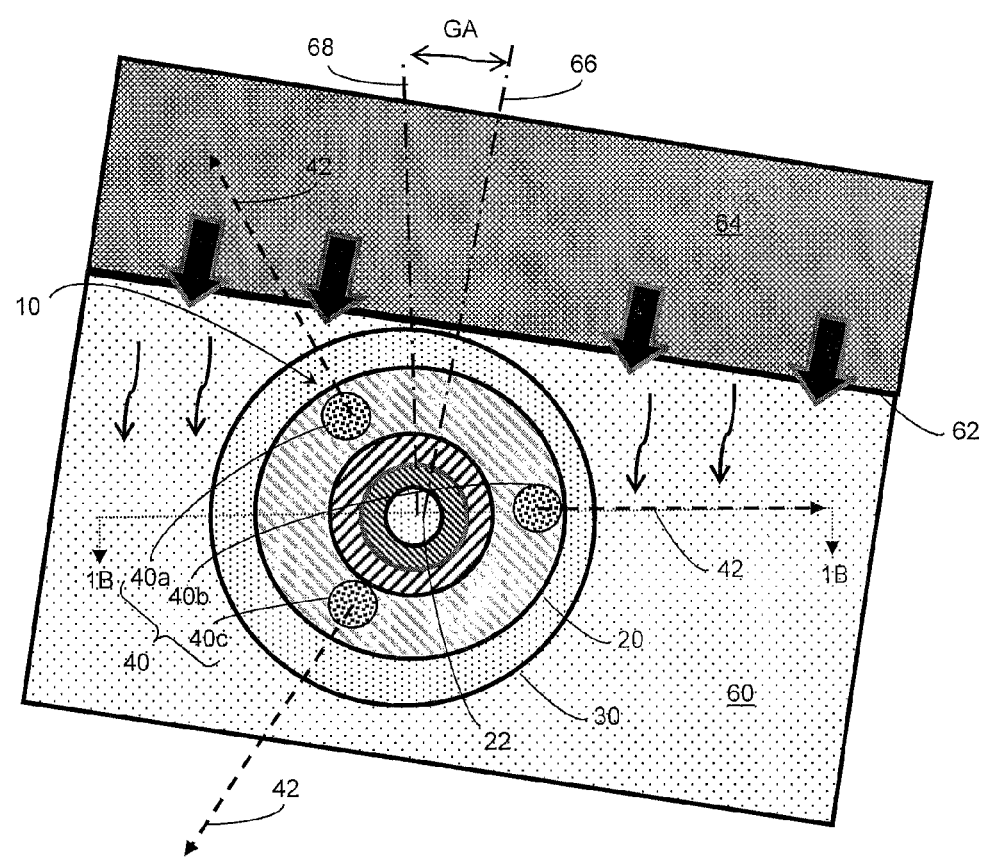
FIGS. 1A and 1B schematically illustrate two cross-sectional views of an example wellbore survey tool in accordance with certain embodiments described herein.

Although certain configurations and examples are disclosed herein, the subject matter extends beyond the examples in the specifically disclosed configurations to other alternative configurations and/or uses, and to modifications and equivalents thereof. Thus, the scope of the claims appended hereto is not limited by any of the particular configurations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain configurations; however, the order of description should not be construed to imply that these operations are order-dependent. Additionally, the structures, systems, and/or devices described herein may be embodied as integrated components or as separate components. For purposes of comparing various configurations, certain aspects and advantages of these configurations are described. Not necessarily all such aspects or advantages are achieved by any particular configuration. Thus, for example, various configurations may be carried out in a manner that achieves or optimizes one advantage or group of advantages as taught herein without necessarily achieving other aspects or advantages as may also be taught or suggested herein. As used herein, relative terms such as "maximum," "minimum," "high," "low," "higher," "lower," "highest," and "lowest" do not signify a particular value or range of values.

Certain embodiments described herein are directed to a method for using multiple gamma ray detectors in a wellbore as part of a downhole survey tool which can undergo slow and/or random roll relative to the vertical high side and the gamma source direction. The downhole survey tool can be used to report from downhole to the surface various gamma ray measurements and parameters including, but not limited to, the average local gamma ray level, the direction to the highest gamma ray level, and the magnitude of variation of the gamma ray level from the highest to lowest measurements around the survey tool which can be represented as a gradient.

As described more fully below, in certain example embodiments, the downhole survey tool can comprise three gamma ray detectors. In an example method of operation, as described more fully below, measurements can be provided with a directional resolution of ±30 degrees with a further sector encoding resolution of ±22.5 degrees, and a total resolution of ±52.5 degrees, with some variation with tool roll angle (e.g., which also can be referred to as subtwist position) of the total measured gamma ray levels and the range of measured gamma ray levels. In another example method of operation, as described more fully below, the gamma ray detector response as a function of roll position can be approximated by a circle, from which the azimuthal gamma angle resolution can be accurate to ±5 degrees, with the total measured gamma ray levels and the range of measured gamma ray levels considered to be consistent with tool roll angle. The resultant data from the downhole gamma ray measurements with a first number of gamma ray detectors (e.g., 3) can be presented at the surface as if the data were collected with a second number of sector positions (e.g., 8 or more) that is larger than the first number. The resultant data can be presented using comparable azimuthal gamma ray plots in a manner in which geo-steering specialists are accustomed.

Figure 1B:
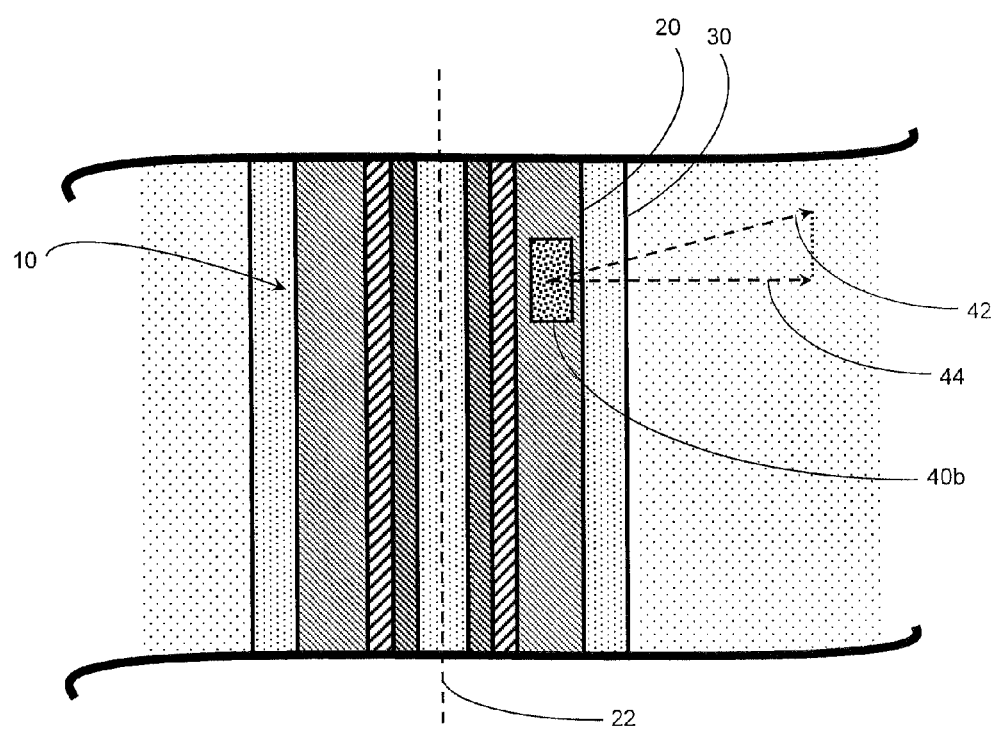

FIGS. 1A and 1B schematically illustrate two cross-sectional views of an example wellbore survey tool 10 in accordance with certain embodiments described herein. The wellbore survey tool 10 comprises a body 20 having a center axis 22, and the body 20 is configured to be placed within a wellbore 30. The cross-sectional view of FIG. 1A is in a plane perpendicular to the center axis 22, and the cross-sectional view of FIG. 1B is in a plane containing the center axis 22. The wellbore survey tool 10 further comprises a plurality of gamma ray detectors 40 within the body 20. Each detector (e.g., detectors 40a, 40b, 40c schematically shown in FIG. 1A) of the plurality of gamma ray detectors 40 has a direction 42 of maximum gamma ray sensitivity with the direction 42 having a non-zero component 44 perpendicular to the center axis 22. The non-zero components 44 of the plurality of gamma ray detectors 40 are spaced circumferentially about the center axis 22.

In certain embodiments, the wellbore survey tool 10 can comprise a measurement-while-drilling (MWD) sensor module and/or a gyro-while drilling (GWD) sensor module. In certain embodiments, the wellbore survey tool 10 can be compatible with gyrocompassing wellbore surveys, MWD surveys, GWD surveys, wireline surveys, slickline surveys, or drop surveys. In certain embodiments, the wellbore survey tool 10 can be part of a steerable drilling tool (e.g., a wellbore drill string) and can be used while drilling of the wellbore 30 is progressing. In certain other embodiments, the wellbore survey tool 10 is separate from the wellbore drill string being used to drill the wellbore 30, and can be used once the drill string is removed from the wellbore 30 (e.g., between sessions in which the drill string is drilling the wellbore 30). For example, the wellbore survey tool 10 can be configured to perform a survey of the previously drilled portion of the wellbore either as the wellbore survey tool 10 is inserted into (e.g., an inrun survey) or extracted from (e.g., an outrun survey) a portion of the wellbore 30 after the portion of the wellbore 30 has been drilled.

In certain embodiments, the body 20 is substantially cylindrical with a center axis 22 extending along the center of the body 20. The body 20 can be configured to bend such that the center axis 22 is not straight, with the bending being performed either controllably (e.g., by a portion of a steerable wellbore drill string comprising the tool 10 with the body 20 configured to be bent under control of a user to selectively steer the drill string in a desired direction while drilling the wellbore 30) or in response to external forces applied to the body 20 as a result of the tool 10 traversing a previously-drilled bent portion of the wellbore 30.

While FIG. 1A schematically illustrates an example plurality of gamma ray detectors 40 comprising three detectors 40a, 40b, 40c, in certain other embodiments, the plurality of gamma ray detectors 40 can comprise 4, 5, 6, 7, 8, or more gamma ray detectors 40. Each detector 40 of the plurality of gamma ray detectors 40 has a response function to incoming gamma rays that is dependent upon the direction along which the gamma rays are incoming relative to the detector 40. For example, the response function of the detector 40 within the body 20 can be highest for gamma rays incoming along a first direction (which can be considered to be the direction 42 of maximum gamma ray sensitivity), and the response function of the detector 40 within the body 20 can be lowest for gamma rays incoming along a second direction (which can be considered to be the direction of minimum gamma ray sensitivity). In certain embodiments, the second direction is opposite to the first direction. The detector 40 can be positioned within the body 20 such that the direction 42 of maximum gamma ray sensitivity is perpendicular to the center axis 22 and points generally away from the center axis 22 (e.g., the direction 42 of maximum gamma ray sensitivity is a direction towards a portion of an outer wall of the body 20 that is closest to the detector 40).

A portion of the inhomogeneous response function of an individual detector 40 can be due to the gamma shielding of the individual detector 40 (e.g., which can be configured to provide a desired inhomogeneous response function), while another portion of the inhomogeneous response function of the individual detector 40 can be due to the structures and materials of the tool 10 asymmetrically surrounding the individual detector 40. In certain embodiments, the response functions of the individual detectors 40 are generally equivalent to one another (e.g., having substantially similar responses to incoming gamma rays; being responsive to gamma rays having substantially similar ranges of energies), while in other embodiments, the response functions of two or more of the individual detectors 40 are substantially different from one another. As used herein, the term "substantially similar" with regard to response functions has its broadest reasonable interpretation, including but not limited to, two or more response functions that do not deviate from one another by more than 5%, 10%, or 20%, depending on the application requirement. As used herein, the term "substantially similar" with regard to ranges of energies has its broadest reasonable interpretation, including but not limited to, ranges with lower energy endpoints that do not deviate from one another by more than 5%, 10%, or 20% and with upper energy endpoints that do not deviate from one another by more than 5%, 10%, or 20%, depending on the application requirement. Examples of detectors 40 that are compatible with certain embodiments described herein include, but are not limited to, the NGT-075 gamma tool of CBG Corp. of Austin, Tex.

As schematically illustrated by FIGS. 1A and 1B, in certain embodiments, each detector 40 of the plurality of gamma ray detectors 40 is offset from the center axis 22 (e.g., having a non-zero distance between the detector 40 and the center axis 22). The offsets can be substantially equal to one another in certain embodiments, as schematically illustrated by FIG. 1A. In certain other embodiments, the offset from the center axis 22 of at least one detector 40 is different from the offset from the center axis 22 of one or more of the other detectors 40.

The gamma ray detectors 40 can be positioned within the body 20 such that the non-zero components 44 of the directions 42 of maximum gamma ray sensitivity are generally equally spaced circumferentially about the center axis 22. For example, as schematically illustrated in FIG. 1A, the three detectors 40a, 40b, 40c are positioned within the body 20 such that the non-zero components 44 are spaced circumferentially about the center axis 22 by 120 degrees from one another. In certain other embodiments, the non-zero components 44 of the plurality of gamma ray detectors 40 are not equally spaced circumferentially about the center axis 22.

The direction 42 of maximum gamma ray sensitivity for one or more of the detectors 40 in certain embodiments is perpendicular to the center axis 22 such that the non-zero component 44 of the direction 42 is equivalent to the direction 42. In certain other embodiments, as schematically illustrated by FIG. 1B, the direction 42 of maximum gamma ray sensitivity for one or more of the detectors 40 is not perpendicular to the center axis 22 such that the non-zero component 44 of the direction 42 has a smaller magnitude than does the direction 42.

The detectors 40 of certain embodiments are positioned within the body 20 such that the non-zero components 44 of the detectors 40 are coplanar with one another. For example, the detectors 40 can all be in a common plane that is perpendicular to the center axis 22 such that the non-zero components 44 of all the detectors 40 are coplanar with one another. In certain other embodiments, the detectors 40 are positioned within the body 20 such that at least one of the non-zero components 44 is not coplanar with one or more of the other non-zero components 44. For example, at least one detector 40 can be in a first plane perpendicular to the center axis 22 and one or more of the other detectors 40 can be in a second plane perpendicular to the center axis 22, with the second plane different from the first plane.

In certain embodiments, each of the detectors 40 is configured to generate a signal indicative of a gamma ray detection level measured by the detector 40. For example, the signal of a detector 40 can be indicative of a gamma ray detection rate expressed as a number of counts per unit time (e.g., counts per second). For another example, the signal of a detector 40 can be indicative of a gamma ray detection level expressed as a number of gamma rays (e.g., counts) detected during a predetermined amount of time (e.g., during a one-second interval). In certain embodiments, the signal of the detector 40 is indicative of an instantaneous gamma ray detection level, while in certain other embodiments, the signal of the detector 40 is indicative of an average gamma ray detection level calculated over a predetermined amount of time.

Figure 2:
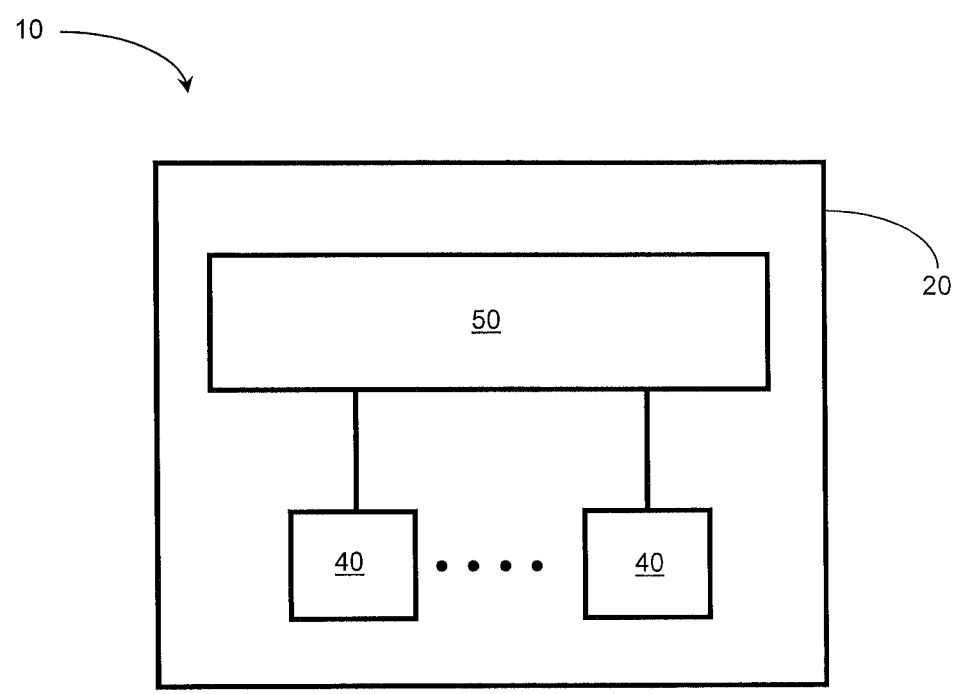
FIG. 2 schematically illustrates an example wellbore survey tool comprising a controller in accordance with certain embodiments described herein.

In certain embodiments, the wellbore survey tool 10 further comprises a controller 50 within the body 20 and configured to receive the signals indicative of gamma ray detection levels from the plurality of gamma ray detectors 40, as schematically illustrated by FIG. 2. The controller 50 of certain embodiments comprises a microprocessor configured to operate within the wellbore 30. Examples of controllers 50 compatible with certain embodiments described herein include, but are not limited to, 32-bit microcontrollers from Silicon Labs of Austin, Tex., PIC 8-, 16-, or 32-bit microcontrollers from Microchip Technology, Inc. of Chandler, Ariz., or microcontrollers rated for high-temperature use (e.g., 150 C, 175 C). As described more fully below, the controller 50 is configured to utilize the signals received from the plurality of gamma ray detectors 40 to provide information regarding the gamma ray distribution produced by the environment containing the wellbore survey tool 10. In certain embodiments, the controller 50 is further configured to provide information to a user that is indicative of a location of the wellbore drilling tool 10 relative to a formation boundary. In certain embodiments in which the wellbore survey tool 10 is used to survey the wellbore 30 non-concurrently with drilling the wellbore 30 (e.g., the wellbore survey tool 10 is separate from a wellbore drill string), the information provided to the user can be used to selectively steer the wellbore drill string in a desired direction once drilling re-commences. In certain other embodiments in which the wellbore survey tool 10 is part of a wellbore drill string, the information provided to the user can be used to selectively steer the wellbore drill string in a desired direction while drilling.

FIG. 1A schematically illustrates an example environment in which the wellbore survey tool 10 may be used in accordance with certain embodiments described herein. The wellbore 30 of FIG. 1A is in a first region 60 containing material emitting gamma rays at a first emission rate near a formation boundary 62 between the first region 60 and a second region 64 containing material emitting gamma rays at a second emission rate different than the first emission rate (e.g., greater than or less than the first emission rate). As a result of the second emission rate being different than the first emission rate, the gamma ray distribution measurable by the detectors 40 is inhomogeneous and the gamma ray distribution can have an extremum (e.g., a maximum or a minimum) pointing along a direction generally perpendicular to the formation boundary 62. Such formation boundaries 62 can result from the layered nature of varying rock formations and can be detected by the plurality of gamma ray detectors 40 when the wellbore 30 is in one layer type and close to a formation boundary 62 with another layer type with a different gamma ray intensity (e.g., gamma ray emission rate). In certain such embodiments, the wellbore 30 is in a region containing material emitting gamma rays at a higher emission rate than the material contained in a nearby region, while in certain other such embodiments, the wellbore 30 is in a region containing material emitting gamma rays at a lower emission rate than the material contained in a nearby region. For certain embodiments in which the wellbore 30 is near a formation boundary 62 between two regions of differing gamma ray emission rates, the gamma direction 66 can be defined as a direction along the extremum (e.g., maximum or minimum) gamma intensity change, and can be measured by an angle from a "high side" direction 68 of the wellbore survey tool 10. The magnitude of the inhomogeneity of the gamma ray distribution measured by the detectors 40 (e.g., a gamma ray gradient or directional intensity) will depend on the distance between the wellbore 30 and the formation boundary 62, as well as the relative difference between the gamma ray emission rates from the two regions on either side of the formation boundary 62.

In conventional wellbore survey systems utilizing only a single gamma ray detector, the single gamma ray detector is positioned within a portion of the system that rotates about an axis of the system at a rapid rate (e.g., 100-250 revolutions per minute). In contrast, in certain embodiments described herein, while the plurality of gamma ray detectors 40 is positioned within a portion of the body 20 that is configured to rotate about the center axis 22, the rotation rate during operation of the tool 10 (e.g., the roll rate) is nominally zero (e.g., less than 10 minutes per revolution or less than 36 degrees per minute). Certain such embodiments can be referred to as having a "non-rotating" body 20 since the rotation rate of the portion of the body 20 containing the plurality of gamma ray detectors 40, while not equal to zero, is substantially less than the rotation rate of the body of a conventional wellbore survey system.

Since the roll rate of the body 20 is non-zero, the orientation of each of the detectors 40 of the plurality of gamma ray detectors 40 within the body 20 relative to the vertical direction is variable with time. In certain embodiments, the wellbore survey tool 10 comprises one or more directional sensors (e.g., accelerometer sensors) within the body 20 and configured to provide information indicative of the orientation (e.g., roll angle, subtwist position) of the plurality of gamma ray detectors 40 relative to the center of the Earth (e.g., relative to the vertical direction).

Figure 3A:
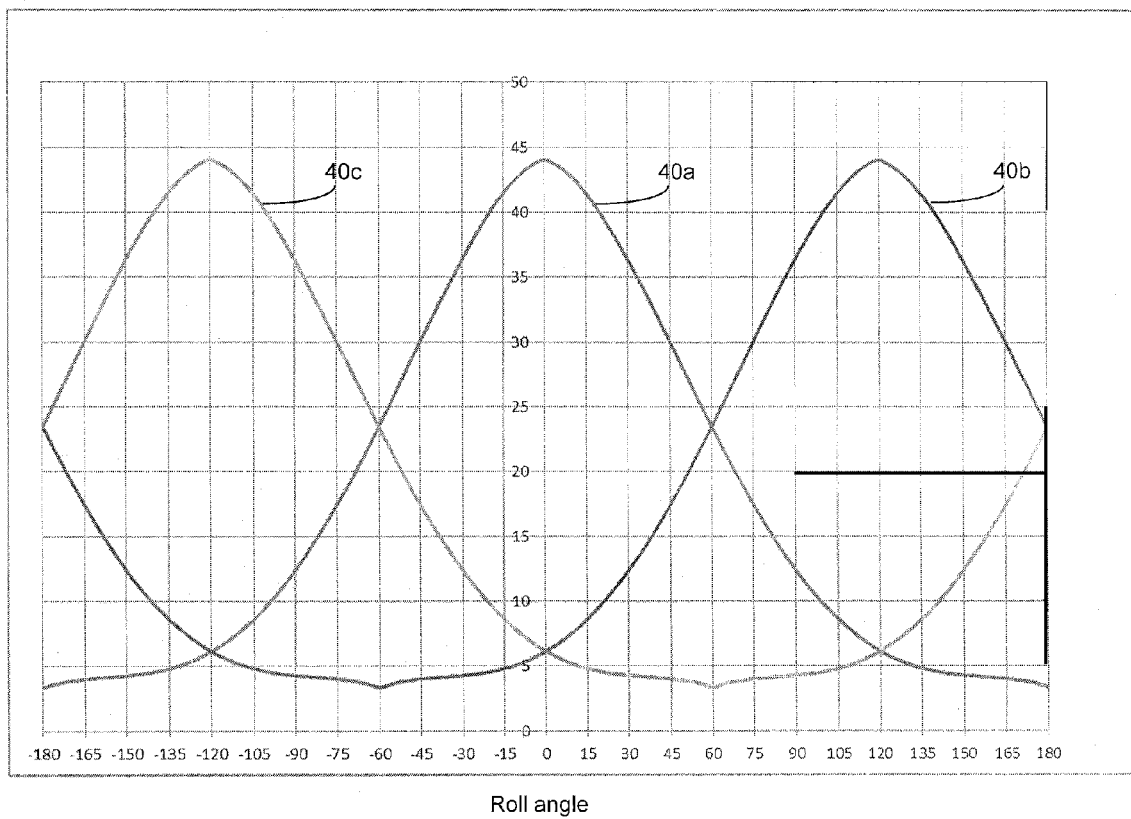
FIG. 3A is a workshop test plot of gamma ray measurements as a function of roll angle for an example plurality of gamma ray detectors comprising three detectors having their non-zero components equally spaced circumferentially about the center axis in accordance with certain embodiments described herein.

FIG. 3A is a workshop test plot of gamma ray measurements as a function of roll angle for an example plurality of gamma ray detectors 40 comprising three detectors 40a, 40b, 40c having their non-zero components equally spaced circumferentially about the center axis 22 (e.g., by 120 degrees from one another) in accordance with certain embodiments described herein. FIG. 3A was created using a smoothed trendline through workshop test data using a polynomial curve fitting method. The y-axis denotes the gamma ray detector response in recorded gamma counts per second. FIG. 3D is a plot of gamma ray measurements as a function of subtwist position (e.g., roll angle) for an example plurality of gamma ray detectors comprising three detectors having their non-zero components equally spaced circumferentially about the center axis in accordance with certain embodiments described herein. Measurements such as those shown in FIG. 3D can be used to generate smoothed trendlines, e.g., as shown in FIG. 3A. The detectors 40a, 40b, 40c were substantially identical to one another with substantially identical gamma ray response functions. Each of the detectors 40a, 40b, 40c was offset from the center axis 22 by the same distance, the plurality of gamma ray detectors 40 was positioned at a location in proximity to a directional gamma ray source approximating a formation boundary 62, and the plurality of gamma ray detectors 40 were rotated about the center axis 22 by a non-zero roll rate. The measurements from each detector 40 (denoted by the labels of the corresponding detectors 40a, 40b, 40c) have a maximum at a first roll angle and a minimum at a second roll angle generally 180 degrees from the first roll angle. For example, detector 40b measured a maximum gamma emission rate at a roll angle defined to be at zero degrees (corresponding to detector 40b being at its closest distance to the gamma ray source) and a minimum gamma emission rate at a roll angle of ±180 degrees (corresponding to detector 40b being at is farthest distance from the gamma ray source). In addition, the measurements from each of these detectors 40 are substantially identical to one another, and are offset from one another by 120 degrees in roll angle, corresponding to the spacing between the detectors 40 circumferentially about the center axis 22. For example, while detector 40b measures its maximum at a roll angle of zero degrees, detector 40c measures its maximum at a roll angle of 120 degrees.

Figure 3B:
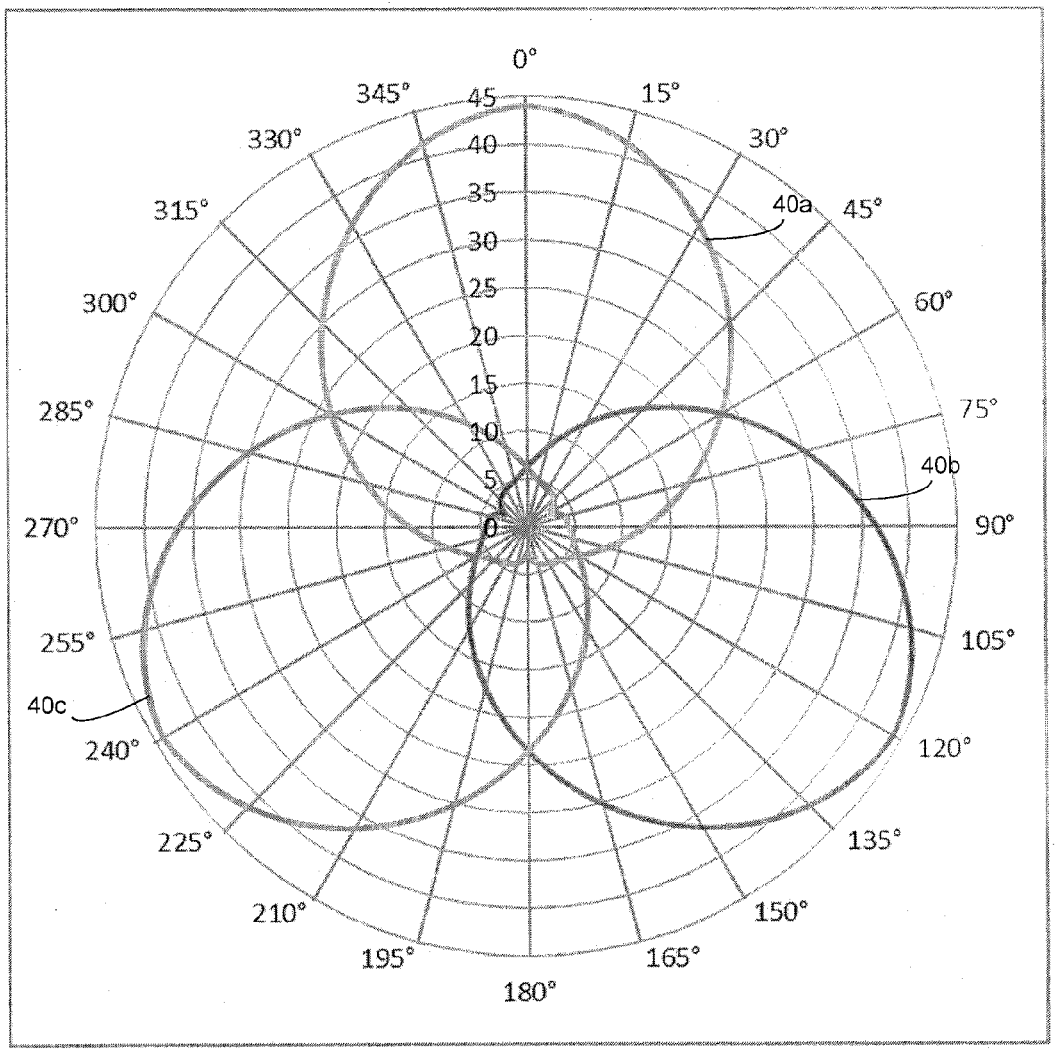
FIG. 3B is a polar plot of the same measurements as in FIG. 3A.

FIG. 3B is a polar plot of the same measurements as in FIG. 3A (denoted by the labels of the corresponding detectors 40a, 40b, 40c). FIG. 3B was created using a smoothed trendline through workshop test data using a polynomial curve fitting method. FIG. 3E is a polar plot of the same measurements as in FIG. 3D. As in FIGS. 3A and 3D, the measurements from each detector 40 have a maximum at a first roll angle and a minimum at a second roll angle generally 180 degrees from the first roll angle, and are substantially identical to one another but offset from one another by 120 degrees in roll angle.

Figure 3C:
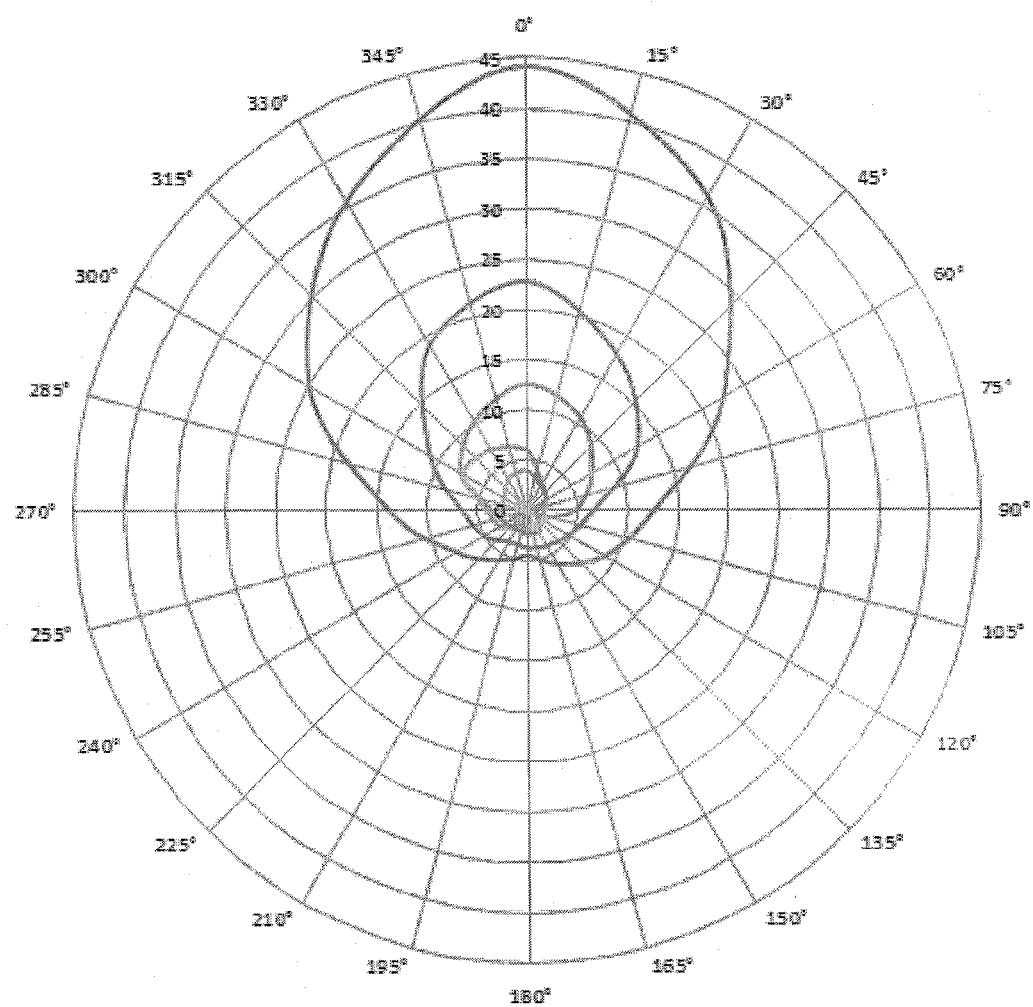
FIG. 3C is a polar plot of the workshop test data measured from one of the detectors 40 taken at various distances from the directional gamma ray source to approximate the wellbore survey tool 10 being at various distances from a formation boundary 62 in accordance with certain embodiments described herein.
Figure 3D:
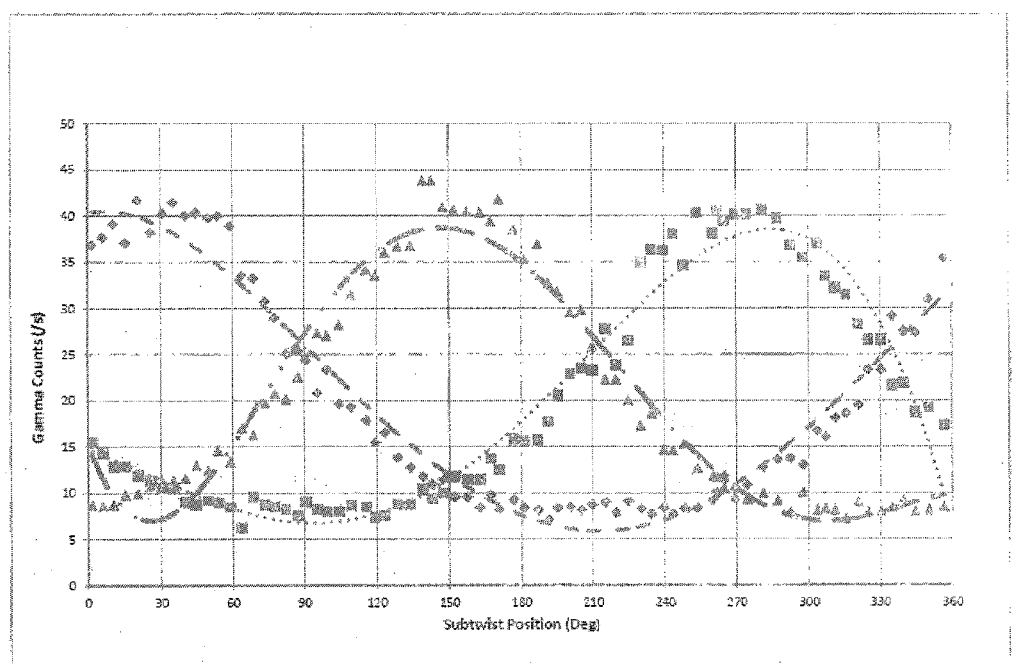
FIG. 3D is a plot of gamma ray measurements as a function of subtwist position for an example plurality of gamma ray detectors comprising three detectors having their non-zero components equally spaced circumferentially about the center axis in accordance with certain embodiments described herein.
Figure 3E:
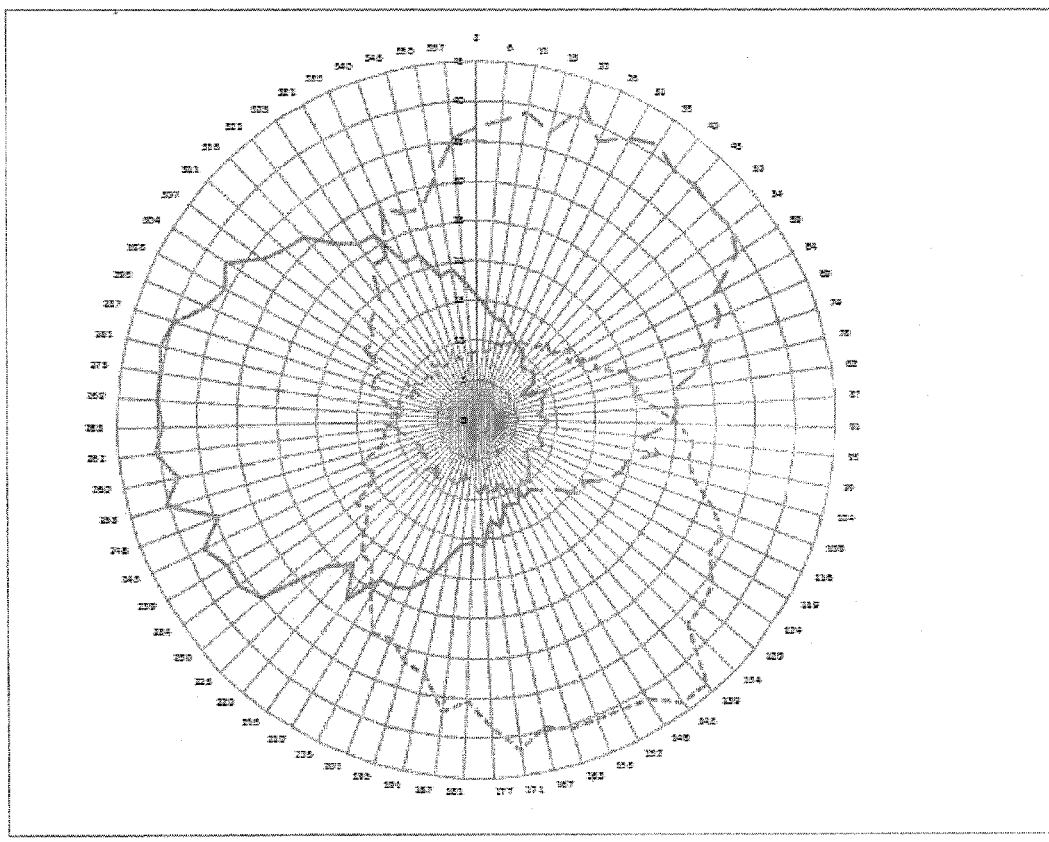
FIG. 3E is a polar plot of the same measurements as in FIG. 3D.

FIG. 3C is a polar plot of the workshop test data measured from one of the detectors 40 taken while the plurality of gamma ray detectors 40 was at various distances from the directional gamma ray source to approximate the wellbore survey tool 10 being at various distances from a formation boundary 62 in accordance with certain embodiments described herein. The various measurements as a function of roll angle have substantially similar shapes as one another, but have decreasing intensity as the detector 40 is positioned farther from the directional gamma ray source. When the plurality of gamma ray detectors 40 is sufficiently far from the directional gamma ray source, the measured gamma ray distribution is approximately homogeneous at all roll angles, and trends towards a circular shape centered about the origin as the maximum intensity decreases.

In certain embodiments, the controller 50 receives the signals indicative of the gamma ray detection levels of each of the detectors 40 of the plurality of gamma ray detectors 40 and is configured to calculate various parameters in response to the received signals. For example, the controller 50 can be configured to calculate a local gamma level G in response to the signals from the plurality of gamma ray detectors 40. The local gamma level G can be proportional to a sum of the gamma ray detection levels $G_n$ of the plurality of gamma ray detectors 40 (e.g., $\Sigma G_n = G_1 + G_2 + \ldots + G_n$) where n is the number of gamma ray detectors 40. Alternatively, the local gamma level G can be proportional to an average of the gamma ray detection levels $G_n$ of the plurality of gamma ray detectors 40 (e.g., $\Sigma G_n/n = G_1/n + G_2/n + \ldots + G_n/n$) where n is the number of gamma ray detectors 40. Certain embodiments advantageously calculate the local gamma level as being proportional to the average of the gamma ray detection levels so that the resultant local gamma level is close to the gamma ray detection level of a single detector 40. In certain embodiments, correction factors can be applied to the measured readings from the detectors to compensate for gamma signal attenuation (e.g., due to collar thickness, drilling mud, thickness of metal of the drilling tool positioned between the detector and the formation that is emitting the gamma rays). For example, a collar correction factor can be about 3 and a drilling mud correction factor can be about 1.3. Example charts of correction factors for NGT-T and NGT-TX gamma tools for geosteering and MWD are available from CBG Corp. of Austin, Tex.

Figure 4:
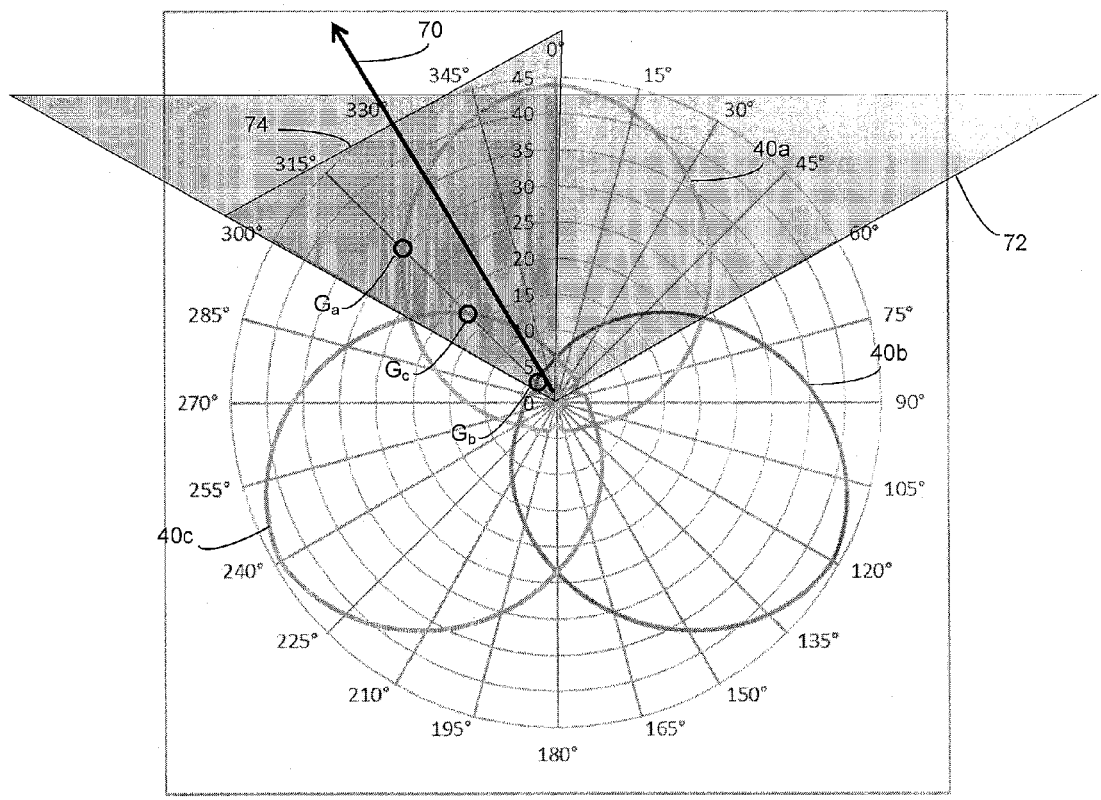
FIG. 4 schematically illustrates an example comparison used in calculating an estimated gamma direction that is an estimate of the direction of highest gamma intensity of the environment in which the tool is positioned in accordance with certain embodiments described herein.

The controller 50 of certain embodiments is further configured to calculate an estimated gamma direction 70 by comparing the gamma ray detection levels of the plurality of gamma ray detectors 40 to one another. FIG. 4 schematically illustrates an example comparison used in calculating an estimated gamma direction 70 that is an estimate of the gamma direction 66 (e.g., the direction of highest gamma intensity) of the environment in which the tool 10 is positioned in accordance with certain embodiments described herein. The gamma direction 66 of the environment in which the tool 10 is positioned can be due to a formation boundary 62 between regions with different gamma ray emission rates, and the gamma direction 66 can be generally perpendicular to the formation boundary 62 (see, e.g., FIG. 1A). FIG. 4 shows the polar plot of FIG. 3B, corresponding to measurements taken by a tool 10 having three detectors 40a, 40b, 40c (with the measurements denoted by the labels of the corresponding detectors 40a, 40b, 40c). At any given moment, the tool 10 has a roll angle and the detectors 40 each provide a signal indicative of the gamma ray detection level of the detector 40. For example, at a roll angle of 315 degrees, the detector 40a provides a signal corresponding to the gamma ray detection level Ga measured by the detector 40a, the detector 40b provides a signal corresponding to the gamma ray detection level Gb measured by the detector 40b, and the detector 40c provides a signal corresponding to the gamma ray detection level Gc measured by the detector 40c.

These signals can be used to calculate an estimated gamma direction 70 at the corresponding moment. For example, the highest gamma ray detection level from the three detectors 40 can denote a 120-degree sector 72 within which the gamma direction 66 resides. The estimated gamma direction 70 can be determined by splitting this sector 72 into two 60-degree sub-sectors 74. By comparing the two lower gamma ray detection levels, the higher of the two gamma ray detection levels can denote the 60-degree sub-sector 74 within which the gamma direction 66 resides. If a resolution of 60 degrees (or a tolerance of +30 degrees) is adequate for determining the gamma direction 66, then the estimated gamma direction 70 can be determined to be the center of the denoted 60-degree sub-sector.

For example, to calculate the estimated gamma direction 70 using the gamma ray detection levels Ga, Gb, Gc in accordance with certain embodiments described herein corresponding to FIGS. 3A, 3B, and 4:

If Ga>Gb>Gc, then the estimated gamma direction 70 is determined to be at +30 degrees relative to the roll angle of zero degrees.

If Gb>Ga>Gc, then the estimated gamma direction 70 is determined to be at +90 degrees relative to the roll angle of zero degrees.

If Gb>Gc>Ga, then the estimated gamma direction 70 is determined to be at +150 degrees relative to the roll angle of zero degrees.

If Gc>Gb>Ga, then the estimated gamma direction 70 is determined to be at +210 degrees relative to the roll angle of zero degrees.

If Gc>Ga>Gb, then the estimated gamma direction 70 is determined to be at +270 degrees relative to the roll angle of zero degrees.

If Ga>Gc>Gb, then the estimated gamma direction 70 is determined to be at +330 degrees relative to the roll angle of zero degrees.

In certain other embodiments, other comparisons may be used in addition to, or in replacement of, the comparisons described above to provide further information for calculating the estimated gamma direction 70. If the comparison shows that the two lower gamma ray detection levels are approximately equal to one another (e.g., within 5% or 10%), then the estimated gamma direction 70 can be determined to be at the corresponding angle. For example, if Ga>Gb=Gc, then the estimated gamma direction 70 is determined to be at 0 degrees relative to the roll angle of zero degrees. If the comparison shows that upper gamma ray detection levels are approximately equal to one another (e.g., within 5% or 10%), then the estimated gamma direction 70 can be determined to be at the corresponding angle. For example, if Ga=Gb>Gc, then the estimated gamma direction 70 is determined to be at +60 degrees relative to the roll angle of zero degrees.

Figure 5:
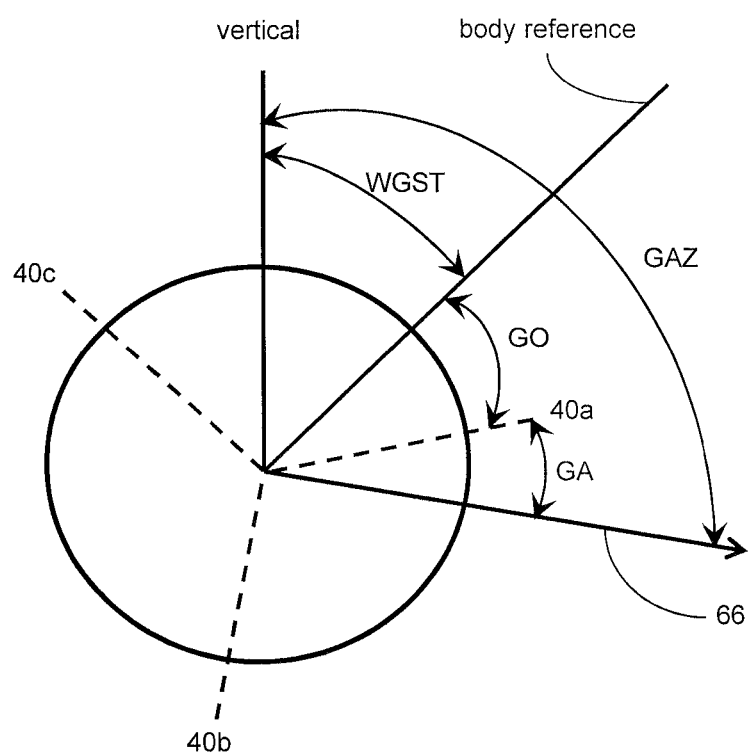
FIG. 5 schematically illustrates various system angles relevant for defining the relative rotations of the tool in accordance with certain embodiments described herein.

FIG. 5 schematically illustrates various system angles relevant for defining the relative rotations of the tool 10 in accordance with certain embodiments described herein. The tool 10 in FIG. 5 is rotated by a roll angle and each of the detectors 40a, 40b, 40c has its direction of maximum gamma ray sensitivity denoted by the labels of the corresponding detectors 40a, 40b, 40c. The gamma direction 66 can be expressed by a gamma angle (GA) between the gamma direction 66 and the direction of maximum gamma ray sensitivity of a selected one of the detectors 40 (e.g., detector 40a). GA can be derived from the measured gamma ray detection levels from the detectors 40a, 40b, 40c. For example, the gamma direction 66 can be estimated to be the estimated gamma direction 70 as described herein.

The gamma direction 66 can also be expressed by a gamma azimuthal angle (GAZ) between the gamma direction 66 and the vertical direction, and in certain embodiments, the controller 50 is configured to calculate GAZ using the following equation: GAZ=GA+GO+WGST, where GO is the gamma offset angle between the reference detector 40 (e.g., detector 40a in FIG. 5) and the body reference direction (e.g., direction of a reference portion of the body 20) and WGST is the rotational angle of the tool body (which can be referred to as a sub-twist angle on the drilling tool, such as a Well-Guide RSS™ Rotary Steerable System from Gyrodata, Inc. of Houston, Tex.) between the body reference direction and the vertical direction. GO generally has a known and fixed value, and WGST is determined by at least one directional sensor (e.g., at least one accelerometer) within the body 20 and configured to provide information to the controller 50 regarding an orientation of the body 20 relative to the vertical direction. Examples of at least one directional sensor compatible with certain embodiments described herein include, but are not limited to, a digital directional measurement unit from National Oilwell Varco, Inc. of Houston, Tex.

In certain embodiments, the controller 50 is configured to use the signals indicative of the gamma ray detection levels of each of the detectors 40 of the plurality of gamma ray detectors 40 to calculate a gamma gradient (GG). GG can be a measure of the variation of the gamma ray detection levels on different sides of the tool 10. The value of GG can be used to indicate if a foundation boundary 62 is nearby, and a changing value of the GG as the tool 10 travels along the wellbore 30 can indicate whether the tool 10 is moving closer to or further from the formation boundary 62.

GG can be calculated in various ways in accordance with various embodiments described herein. For example, GG can be expressed as a dimensionless ratio $GG=G_{large}/G_{small}$, where $G_{large}$ is the largest of the gamma ray detection values $G_n$ detected by the plurality of gamma ray detectors 40 (e.g., the gamma ray detection level from one detector 40 that is greater than the gamma ray detection levels from all the other detectors 40) and $G_{small}$ is the smallest of the gamma ray detection values $G_n$ detected by the plurality of gamma ray detectors 40 (e.g., the gamma ray detection level from one detector 40 that is less than the gamma ray detection levels from all the other detectors 40). For another example, GG can be expressed as one of the following dimensionless ratios: $GG=(G_{large}-G_{small})/G_{small}$, $GG=(G_{large}-G_{small})/G_{ave}$, or $GG=(G_{large}-G_{small})/G_{total}$, where $G_{ave}$ is the average of the gamma ray detection levels $G_n$ from the detectors 40, and where $G_{total}$ is the sum of the gamma ray detection levels $G_n$ from the detectors 40. In a numerical example using $GG=(G_{large}-G_{small})/G_{total}$, an example three detectors 40 (e.g., as in FIG. 1A) provide three gamma ray detection levels of 210, 60, and 50 (arbitrary units), so GG=(210−50)/320=160/320=0.5. Using this example dimensionless ratio for GG, homogeneous rock would be expected to produce a GG tending toward zero and inhomogeneous rock would be expected to produce a GG having a maximum possible of one.

In certain embodiments in which the controller 50 is downhole (e.g., the controller 50 is within a portion of the tool 10 within the wellbore 30), the information generated by the controller 50 in response to the gamma ray detection levels from the detectors 40 is to be transmitted to a location at the Earth's surface outside the wellbore 30, for example, to a computer being used to further analyze and present the information received from the controller 50 to the users of the information (e.g., users directing the steerable drill string or users analyzing the geological formations through which the wellbore 30 extends). However, in certain embodiments, the transmission of such information from within the wellbore 30 to the surface is constrained (e.g., in bandwidth, speed, or both), and it can be advantageous to provide at least some information in a reduced number of bits (e.g., to minimize MWD data transmission time).

It can be advantageous in certain embodiments to encode one or more parameters obtained from the gamma data so as to provide information regarding the gamma measurements. For example, it can be advantageous in certain embodiments to encode at least one of the total gamma ray detection level calculated by the controller 50 in response to the measurements by the plurality of gamma ray detectors 40 (e.g., $\Sigma G_n = G_1+G_2+ \ldots +G_n$, where n is the number of gamma ray detectors 40) and the average gamma ray detection level calculated by the controller 50 in response to the measurements by the plurality of gamma ray detectors 40 (e.g., $\Sigma G_n/n = G_1/n+G_2/n+ \ldots +G_n/n$, where n is the number of gamma ray detectors 40). In certain embodiments, the time period over which the gamma ray detection levels are measured can be varied to allow for scaling of the calculated gamma ray detection level (e.g., to maintain a resolution of 1 API for the average gamma ray detection level), taking the contributory effects of steel collars and mud correction factors into account. In certain embodiments in which the maximum value expected is 800 and eight bits are used to transmit the information regarding the total gamma ray detection level, a scaling algorithm can be used with degraded resolution at higher API values, as is understood by the skilled artisan.

Figure 6:
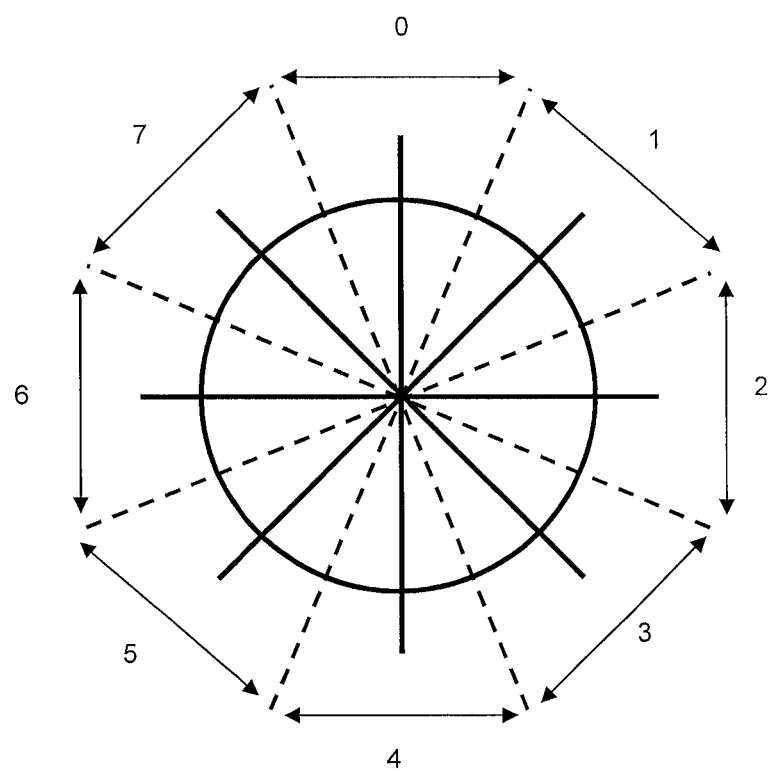
FIG. 6 schematically illustrates the full 360 degrees possible for GAZ, divided into an of example eight 45-degree sectors, numbered 0-7, in accordance with certain embodiments described herein.

For another example, it can be advantageous in certain embodiments to encode the gamma azimuthal angle (GAZ) to specify in which sector of a plurality of sectors the gamma direction 66 or the estimated gamma direction 70 resides. FIG. 6 schematically illustrates the full 360 degrees possible for GAZ, divided into an example of eight 45-degree sectors, numbered 0-7, in accordance with certain embodiments described herein. In the example of FIG. 6, three bits can be used to denote values 0-7, specifying in which of the individual sectors GAZ resides. The sector denoted by "0" can be in the vertical direction, regardless of other tool rotation angles.

In certain other embodiments, using more bits, the 360 degrees can be divided into smaller and more numerous sectors, providing better resolution. For example, using four bits the number of sectors can be increased to 16, with each sector having 22.5 degrees. Such a configuration could be useful if the gamma angle is determined to similar accuracy. As described above, the estimated gamma direction 70 has a resolution limit related to the calculation method used (e.g., ±30 degrees), and the sector encoding would add another degradation on this resolution.

For another example, it can be advantageous in certain embodiments to encode the gamma gradient (GG). Generally, the encoding can be dependent on the method used for calculating GG, e.g., one of the methods described above. GG can be encoded into a normalized scale (e.g., from zero through one), and four bits can be used to allow for dividing GG into 16 ranges, encoded as 0-15. Table 1 illustrates an example in which a calculated value of the normalized GG is encoded into 16 equally-sized ranges.

TABLE 1

|    | Minimum value | Maximum value |
|----|---------------|---------------|
| 0  | 0             | 0.0625        |
| 1  | 0.0625        | 0.125         |
| 2  | 0.125         | 0.1875        |
| 3  | 0.1875        | 0.25          |
| 4  | 0.25          | 0.3125        |
| 5  | 0.3125        | 0.375         |
| 6  | 0.375         | 0.4375        |
| 7  | 0.4375        | 0.5           |
| 8  | 0.5           | 0.5625        |
| 9  | 0.5625        | 0.625         |
| 10 | 0.625         | 0.6875        |
| 11 | 0.6875        | 0.75          |
| 12 | 0.75          | 0.8125        |
| 13 | 0.8125        | 0.875         |
| 14 | 0.875         | 0.9375        |
| 15 | 0.9375        | 1             |

Table 2 illustrates an example in which a calculated value of the normalized GG is encoded into 16 ranges of differing sizes, with ranges 0-7 each having a size of 0.03125, ranges 8-11 each having a size of 0.0625 (2× the size of ranges 0-7), and ranges 12-15 each having a size of 0.125 (4× the size of ranges 0-7).

TABLE 2

|    | Multiple | Size    | Minimum value | Maximum value |
|----|----------|---------|---------------|---------------|
| 0  | 1        | 0.03125 | 0             | 0.03125       |
| 1  | 1        | 0.03125 | 0.03125       | 0.0625        |
| 2  | 1        | 0.03125 | 0.0625        | 0.09375       |
| 3  | 1        | 0.03125 | 0.09375       | 0.125         |
| 4  | 1        | 0.03125 | 0.125         | 0.15625       |
| 5  | 1        | 0.03125 | 0.15625       | 0.1875        |
| 6  | 1        | 0.03125 | 0.1875        | 0.21875       |
| 7  | 1        | 0.03125 | 0.21875       | 0.25          |
| 8  | 2        | 0.0625  | 0.25          | 0.3125        |
| 9  | 2        | 0.0625  | 0.3125        | 0.375         |
| 10 | 2        | 0.0625  | 0.375         | 0.4375        |
| 11 | 2        | 0.0625  | 0.4375        | 0.5           |
| 12 | 4        | 0.125   | 0.5           | 0.625         |
| 13 | 4        | 0.125   | 0.625         | 0.75          |
| 14 | 4        | 0.125   | 0.75          | 0.875         |
| 15 | 4        | 0.125   | 0.875         | 1             |

Once the data has been sent to the surface, the data is advantageously presented to the user in a useful form (e.g., in a form most useful to the directional and/or geological team). For example, the value for the average gamma detection level can be presented as calculated, and the gamma azimuthal angle can be presented as a decoded angle. The gamma gradient can be presented in various ways, including but not limited to, as a range (e.g., a difference between the maximum and minimum values) and as the actual calculated maximum and minimum values.

As shown in FIGS. 3B and 3C, the measured gamma ray detection level from a detector 40 changes with roll angle, and the measured gamma ray detection level for a detector 40 changes with distance from the gamma ray source (e.g., the formation boundary 62). In certain embodiments, the measurements from a detector (e.g., one or more detectors 40 of the plurality of detectors 40 of the tool 10) within the wellbore 30 can be approximated by a geometric figure which can facilitate determining approximate values for the one or more parameters to be obtained from the gamma data.

In certain embodiments, the controller 50 is configured to calculate a geometric approximation in response to the signals from the plurality of gamma ray detectors 40. The geometric approximation approximating an estimated set of gamma ray detection levels of each detector 40 of the plurality of gamma ray detectors 40 (e.g., three or more gamma ray detectors 40) expected during a hypothetical rotation of the body 20 about the center axis 22 while the body 20 is substantially stationary in a direction along the wellbore 30.

Figure 7A:
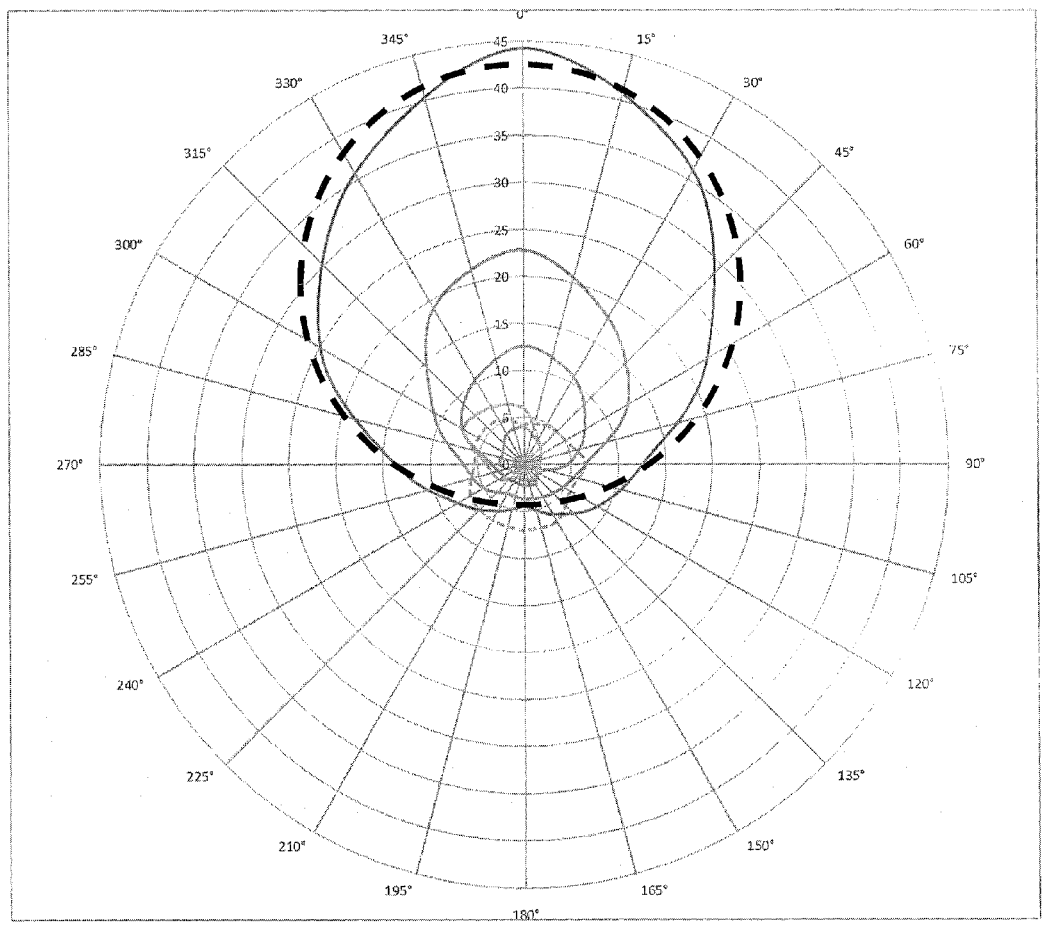
FIG. 7A schematically illustrates an example geometric approximation of the measurements from a detector in accordance with certain embodiments described herein.

FIG. 7A schematically illustrates an example geometric approximation of the measurements from a detector 40 in accordance with certain embodiments described herein. In FIG. 7A, the geometric approximation is a circle 80 overlaid onto the plot of the measurements 82 taken by one detector of FIG. 3C. While FIG. 7A shows an example embodiment in which the geometric figure being used to approximate the measurements of the detector 40 is a circle, in certain other embodiments, other geometric figures can be used (e.g., ellipse, oval, cardioid).

In certain embodiments, the geometric figure to be used is determined by measurements taken using the detector 40 outside of the wellbore 30 (e.g., in a controlled setting prior to use within the wellbore 30, with a known gamma ray source and the tool 40 a known distance from the gamma ray source). In certain other embodiments, the geometric figure to be used is determined using the actual measurements taken using the detector 40 within the wellbore 30 (e.g., calculating which geometric figure provides an approximation of the measurements to a predetermined level of accuracy). In certain embodiments, the detector 40 comprises gamma ray shielding which is designed to produce a predetermined response function for the detector 40 such that, when the detector 40 is used as part of a wellbore survey tool, the measurements from the detector 40 will approximate the predetermined geometric figure.

Figure 7B:
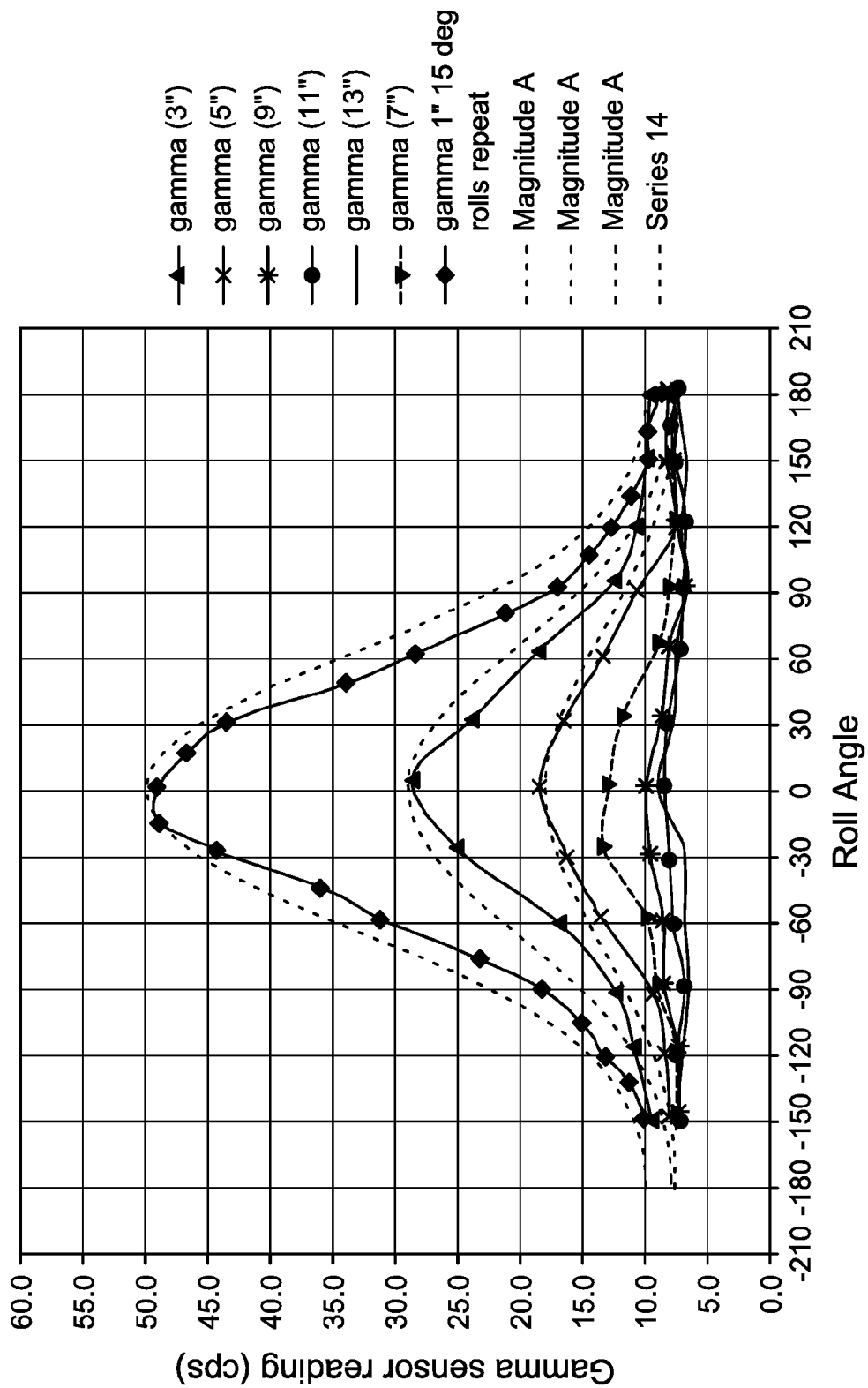
FIG. 7B is a plot of measured gamma ray detection levels as a function of roll angle (shown as solid lines) with dashed lines corresponding to the gamma ray detection levels from an example circle approximation in accordance with certain embodiments described herein.

FIG. 7B is a plot of measured gamma ray detection levels as a function of roll angle (shown as solid lines) with dashed lines corresponding to the gamma ray detection levels from an example circle approximation in accordance with certain embodiments described herein. The gamma ray detection levels (plotted in counts per second) were measured at various distances from a known gamma ray source at various roll angles. The overlay of the example circle approximation onto the measured gamma ray detection levels show that the circle approximation is reasonable for use with such data, and can be advantageously used to predict detector output as a function of roll angle. The data shown in FIG. 7B is plotted in polar form in FIG. 7A, and it can be seen that each polar trace approximates a circle of decreasing diameter with increasing distance from the gamma source. The diameter of the circle approximation can be selected to match the largest measured magnitude from the detector being approximated.

Figure 7C:
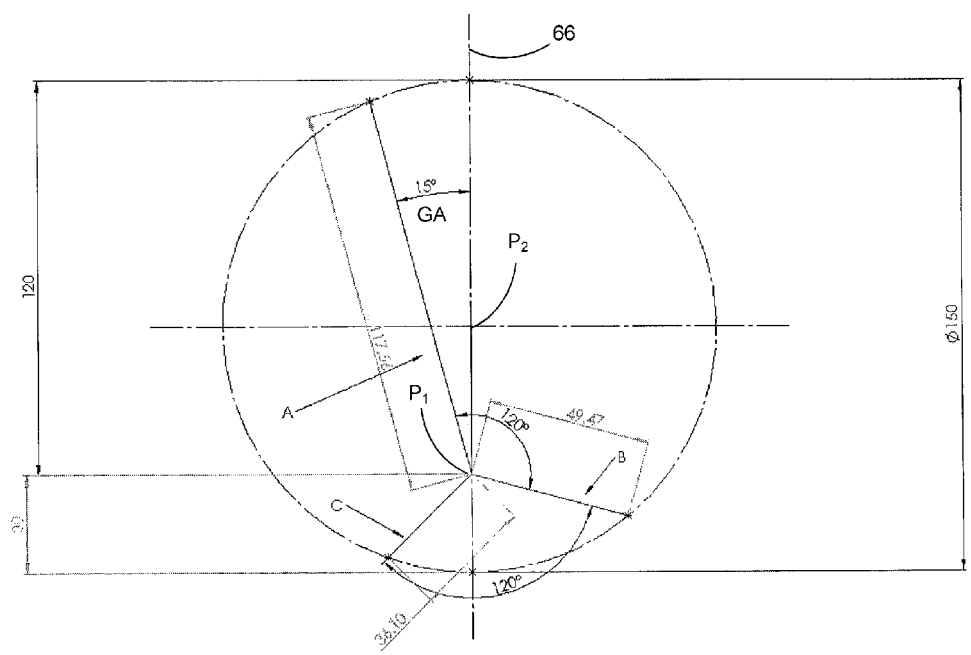
FIG. 7C schematically illustrates an example geometric representation of the gamma ray detection levels as a function of roll angle from a tool comprising at least three detectors in accordance with certain embodiments described herein.

FIG. 7C schematically illustrates an example geometric representation of the gamma ray detection levels as a function of roll angle from a tool 10 comprising at least three detectors 40 in accordance with certain embodiments described herein. While FIG. 7B and the following description are provided in relation to certain embodiments using a tool 10 comprising a plurality of detectors 40 having response functions which are generally equivalent to one another (e.g., having substantially similar responses to incoming gamma rays; being responsive to gamma rays having substantially similar ranges of energies), other certain embodiments use a tool 10 comprising two or more of detectors 40 with response functions that are substantially different from one another. In certain other embodiments, the approximations described herein can be used in conjunction with a wellbore survey tool comprises a single gamma ray detector which undergoes at least one full rotation in roll angle.

The gamma ray detection levels from each detector 40 can be approximated and represented geometrically as gamma ray detection vectors which rotate as a function of roll angle. Each vector has a magnitude corresponding to the gamma ray detection level from the respective detector 40, the magnitude varying as a function of roll angle. The circle is defined by the three or more gamma ray detection vectors which have a common origin and point in directions that are generally equally spaced circumferentially from one another. The circle has a radius R and a center that is offset from the common origin by a distance O along an offset direction.

For example, as schematically illustrated in FIG. 7C, each vector A, B, and C corresponds respectively to the measured gamma ray detection levels from the detectors 40*a*, 40*b*, 40*c*. Each of the three vectors is equally spaced circumferentially by 120 degrees from the other vectors (corresponding to the relative positioning of the detectors 40*a*, 40*b*, 40*c* from one another about the center axis 22, as shown in FIG. 1A). Each of the three vectors rotates as a function of roll angle about a common origin $P_1$ offset from a center $P_2$ of the circle. FIG. 7C corresponds to an example embodiment in which the three detectors 40*a*, 40*b*, 40*c* have substantially similar responses to incoming gamma rays, so the vectors A, B, and C have their moving endpoint circulate along the same circle approximation. In certain embodiments in which the detectors 40 have different responses, different geometric approximations (e.g., different circles) can be used to approximate the different responses.

The diameter D of the circle of FIG. 7C is an estimate of the sum of the maximum gamma ray detection level $G_{max}$ from a detector across all roll angles and the minimum gamma ray detection level $G_{min}$ from a detector across all roll angles. For example, in FIG. 7C, $G_{max}$ is 120, $G_{min}$ is 30, and the diameter D is 150. The radius R of the circle (one-half of the diameter D) is an estimate of the average of $G_{max}$ and $G_{min}$ (e.g., $G_{max}/2+G_{min}/2$). A sum of the radius R and the distance O is an estimate of $G_{max}$ (e.g., $G_{max}$=R+O) during the rotation. A difference of the radius R minus the distance O is an estimate of $G_{min}$ (e.g., $G_{min}$=R−O) during the rotation. The gamma direction 66 (e.g., a direction of highest gamma ray intensity of the gamma ray distribution detected by the plurality of gamma ray detectors) is estimated by the offset direction (e.g., extending from $P_1$ and through the center $P_2$ of the circle). An angle between the offset direction and a gamma ray detection vector is an estimate of an azimuth gamma angle of the gamma ray detector corresponding to the gamma ray detection vector. For example, the gamma azimuthal angle GA corresponds to the angle between the vector A and the gamma direction 66. A ratio of the distance O divided by the radius R provides an estimate of an anisotropy of the gamma ray distribution, with a value of zero corresponding to a homogeneous gamma ray distribution and a value of one corresponding to a theoretical gamma source emitting from only a single direction and perfect shielding of the detectors 40 to only allow detection of gamma rays when oriented with its direction of maximum gamma ray sensitivity along the emission direction. The angle of the calculated offset direction can be referenced to a known angular reference (e.g., gravity highside).

In certain embodiments, the geometric approximation can be used with measurements taken while the tool 10 is at a position along the wellbore 30 (e.g., instantaneous measurements taken substantially simultaneously with one another) from three or more detectors 40 to determine various parameters regarding the gamma ray distribution (e.g., the azimuthal gamma angle, the maximum gamma ray detection level, the minimum gamma ray detection level, the average gamma ray detection level, the anisotropy) at the position along the wellbore 30. For example, in certain embodiments in which the tool 10 is moving along the wellbore 30 at a rate of about 60 feet per hour (one foot per minute), the measurements from three detectors 40 can be taken about every 30 seconds, resulting in a data point about every six to twelve inches along the wellbore 30. Such a data acquisition rate is compatible with a data transmission rate of about 3 bits per second.

Figure 7D:
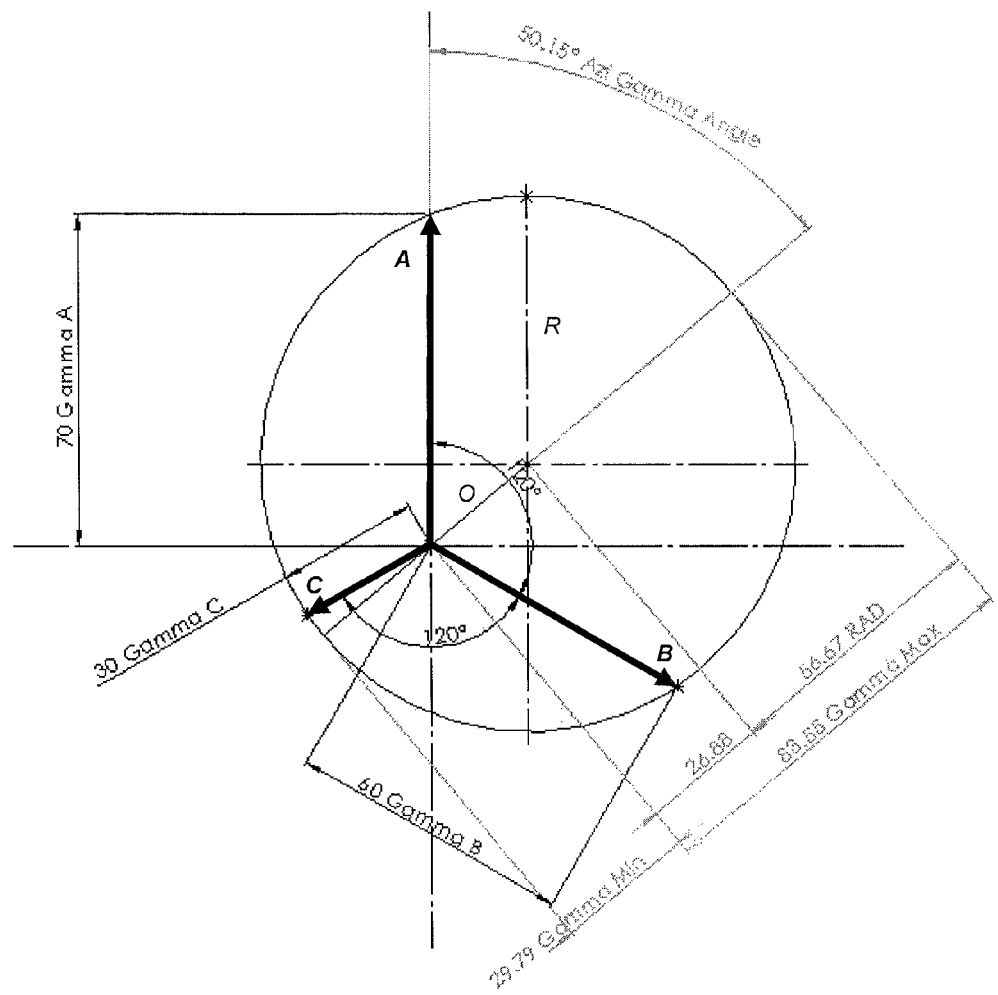
FIG. 7D schematically illustrates an example determination of the azimuthal gamma angle, the maximum gamma ray detection level, and the minimum gamma ray detection level in accordance with certain embodiments described herein.

FIG. 7D schematically illustrates an example determination of the azimuthal gamma angle, the maximum gamma ray detection level, and the minimum gamma ray detection level in accordance with certain embodiments described herein. Referring to FIG. 7D, three measured gamma ray detection levels from the detectors 40*a*, 40*b*, 40*c*, oriented 120 degrees from one another, can be represented by three vectors A, B, C that (i) are 120 degrees apart from one another, (ii) radiate from a common origin, and (iii) each have a length representative of the respective measured gamma ray detection level. One of the detectors 40 can be denoted to be the reference gamma ray detector (e.g., detector 40*a*) and its corresponding vector (e.g., A) can be taken to lie along the y-axis of a Cartesian coordinate system. In the example approximation of FIG. 7D, the ends of each of the three vectors all lie on the same circle. Since three points define a circle uniquely, the definition of the circle that passes through the endpoints of the three vectors can be calculated in terms of a center and a radius R. The angle from the y-axis to the line joining the center of the circle and the common origin of the vectors is an estimate of the gamma azimuthal angle from the reference gamma ray detector (e.g., detector 40*a*). The sum of the radius R and the offset distance O is an estimate of the maximum gamma ray detection level ($G_{max}$) across all roll angles, a difference between the radius R and the offset distance O is an estimate of the minimum gamma ray detection level ($G_{min}$) across all roll angles, and the radius R is an estimate of the average of $G_{max}$ and $G_{min}$.

Certain embodiments advantageously predict the same values of $G_{max}$, $G_{min}$, and the average of $G_{max}$ and $G_{min}$ for any roll angle, rather than using the measured maximum and minimum gamma ray detection levels which can vary somewhat with roll angle. In certain embodiments, the gamma azimuthal angle is calculated to a greater degree of precision, e.g., with an accuracy better than 10 degrees, as compared to ±30 degrees as described above. In certain embodiments, the local gamma ray detection level can be taken as an average of $G_{max}$ and $G_{min}$ (e.g., the radius R of the circle approximation), and a gradient can be calculated as the ratio of the offset distance O and the radius R, with values of O/R that vary from zero to one.

In certain embodiments, the values generated using the geometric approximation can be reported to the surface using similar encoding as described above. Increased precision can be achieved by encoding the gamma azimuthal angle to sixteen sectors, rather than eight, and the gradient can use a logarithmic varying encoding scale (an example of which is shown by Table 2), e.g., with 32 or more steps.

In certain embodiments, using the geometric circle approximation described herein, the transmission of data from within the wellbore 30 to the surface can be compressed into three values: the radius R of the circle, the offset distance O, and the offset direction (e.g., relative to the highside). These three values can be transmitted to the surface instead of the actual gamma ray detection levels. In certain such embodiments, the collection of three (e.g., simultaneous) gamma ray readings from three gamma ray detectors 40 at any rotation position of the tool 10 can be used to estimate the varying gamma ray detection levels for 360 degrees coverage around the tool 10.

In certain embodiments, once the circle approximation has been defined, the gamma ray detection level at any angle can be calculated. Existing gamma ray tools with a single gamma ray detector may collect data in 4, 8, or 16 sectors, and may present the measured value for each of the sectors at depth increments of 0.5 foot or one foot. The three gamma ray detectors 40 of certain embodiments described herein may collect data at only three sectors substantially simultaneously, the values for any number of sectors can be estimated using these measured gamma ray detection levels with the geometric approximation described herein, and these values can be presented to the user (e.g., for the purpose of interpreting the azimuthal gamma data collected).

Figure 8A:
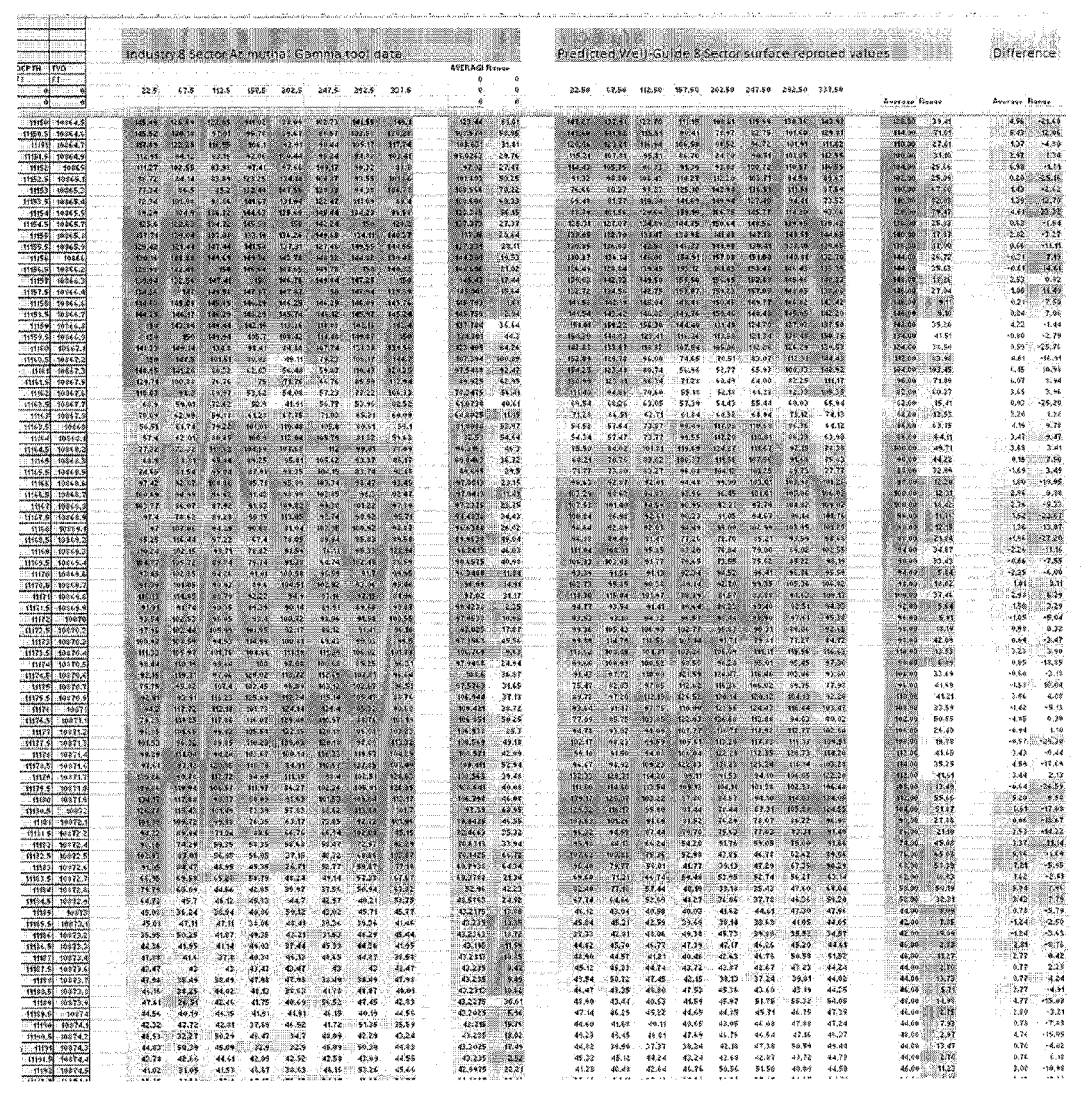
Figure 8B:
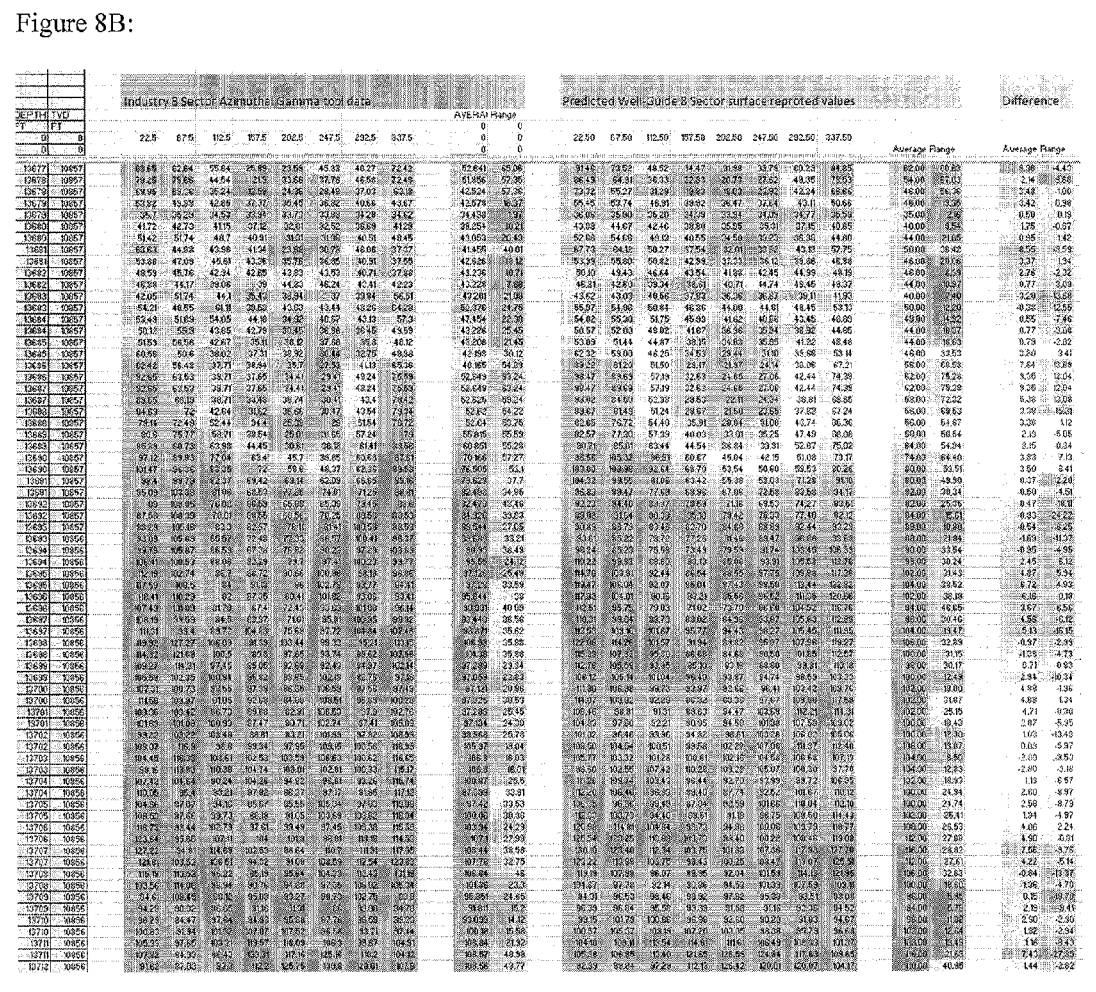

FIGS. 8A and 8B schematically illustrate two example comparisons between data measured along respective wellbore portions from a conventional eight-sector azimuthal gamma ray tool and the values predicted using a tool 10 comprising three detectors 40 in accordance with certain embodiments described herein. The data of FIGS. 8A and 8B were collected using a PathFinder IPZIG tool from Schlumberger, Inc. of Houston, Tex. during the drilling of a horizontal borehole in Texas. The predicted values generated using the three detectors 40 were extracted from the eight values over a range of depths with the values of $G_{max}$, $G_{min}$, and the average of $G_{max}$ and $G_{min}$ processed as described herein. The radius R, the azimuthal gamma angle, and the gradient were calculated as if downhole, with the values encoded as described herein, and then decoded, thereby providing to the surface the values for the average of $G_{max}$ and $G_{min}$, the azimuthal gamma angle, and the gradient.

From these values, the gamma value for an eight-sector plot was calculated for comparison to the original data for a first simulated wellbore portion as shown in FIG. 8A and a second simulated wellbore portion as shown in FIG. 8B. These figures were produced for the purposes of this patent application by generating greyscale images corresponding to the magnitudes of the values, rather than color figures (e.g., using green through yellow and orange into red to pictorially show gamma ray detection levels). Such color-coded displays of varying gamma ray detection levels are commonly used in wellbore surveying for interpreting azimuthal gamma data for gaining an understanding of the formation changes and patterns that the downhole tool 10 is passing through, and further for the aid of steering the tool 10 in a direction that is considered to best satisfy the drilling objectives. The general agreement between the two sets of data in each of the two figures can be pictorially seen in these greyscale images of FIGS. 8A and 8B.

Regardless, inspection of FIGS. 8A and 8B shows the similarity between the two data sets for each of the two simulated wellbore portions. The left-side of these figures shows the measured values obtained using the PathFinder IPZIG tool, and the right-side of these figures shows the calculated values (assuming a three-detector system such as the Well-Guide RSS™ Rotary Steerable System from Gyrodata, Inc. of Houston, Tex.). The error can be computed as the difference between the calculated values and the measured values, and there are two errors considered, the average API level and the range (e.g., maximum value minus minimum value) at each depth station.

Figure 9A:
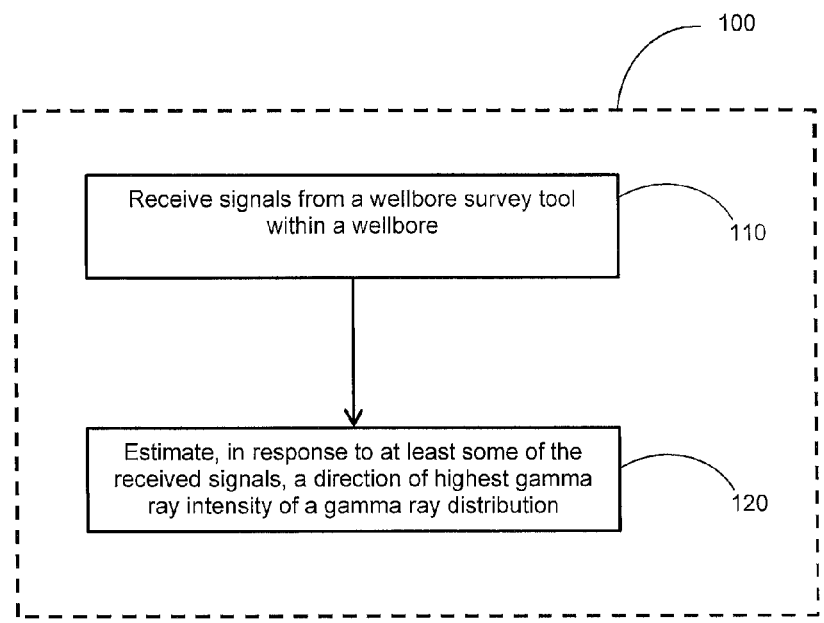
FIG. 9A is a flow diagram of an example method in accordance with certain embodiments described herein.

FIG. 9A is a flow diagram of an example of a method 100 in accordance with certain embodiments described herein. In an operational block 110, the method 100 comprises receiving signals from a wellbore survey tool 10 within a wellbore 30. The tool 10 comprises a center axis 22 and a plurality of gamma ray detectors 40. Each detector 40 of the plurality of gamma ray detectors 40 has a direction 42 of maximum gamma ray sensitivity with the direction 42 having a non-zero component 44 perpendicular to the center axis 22. The non-zero components 44 of the plurality of gamma ray detectors 40 are spaced circumferentially about the center axis 22. The signals are indicative of a gamma ray detection level of each detector 40 of the plurality of gamma ray detectors 40. In an operational block 120, the method 100 further comprises estimating, in response to at least some of the received signals, a direction of highest gamma ray intensity of a gamma ray distribution detected by the plurality of gamma ray detectors 40.

The method 100 can be used in conjunction with a tool 10 as described herein (e.g., in FIGS. 1A, 1B, and 2). For example, the non-zero components 44 of the plurality of gamma ray detectors 40 can be generally equally spaced circumferentially about the center axis 22, or the non-zero components 44 can be spaced at different but known positions relative to the center axis 22 and to one another. The tool 10 can be part of a wellbore drill string which is drilling the wellbore 30 or can be part of a wellbore survey string. Other tools 10 with other configurations may be used in accordance with the method 100 as well.

Figure 9B:
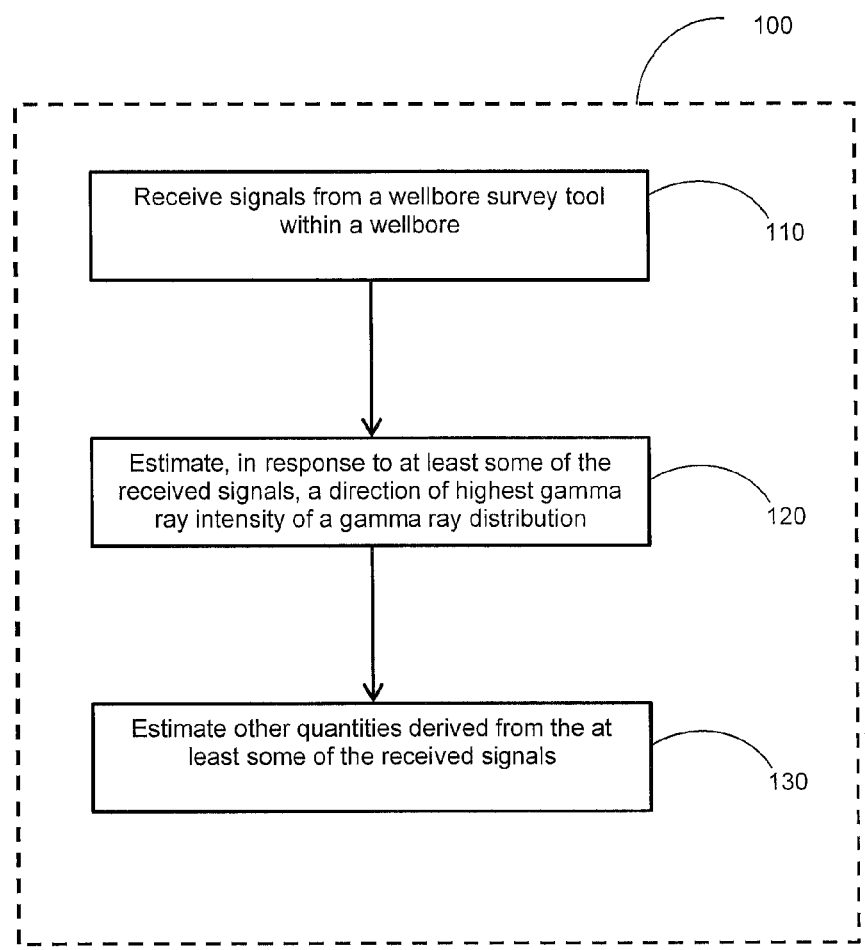
FIG. 9B is a flow diagram of another example method in accordance with certain embodiments described herein.

FIG. 9B is a flow diagram of another example of the method 100 in accordance with certain embodiments described herein. In an operational block 130, the method 100 further comprises estimating other quantities derived from the at least some of the received signals.

For example, the operational block 130 can comprise calculating a local gamma level in response to the at least some of the received signals. The local gamma level can be equal to either an average of the gamma ray detection levels of the plurality of gamma ray detectors 40 or equal to a sum of the gamma ray detection levels of the plurality of gamma ray detectors 40. For another example, the operational block 130 can comprise calculating an estimated gamma direction by comparing the gamma ray detection levels of the plurality of gamma ray detectors 40 to one another, as described herein. These comparisons can be utilized for calculating a gamma azimuthal angle (GAZ) between a vertical direction and the estimated gamma direction. In addition, the operational block 130 can comprise receiving information from at least one directional sensor (e.g., at least one accelerometer) within the tool 10, with the information indicative of an orientation of the body (e.g., WGST) relative to the vertical direction. Using the information, certain embodiments include calculating the gamma azimuthal angle.

For still another example, the operational block 130 can comprise estimating, in response to the at least some of the received signals, a distance of the tool 10 from a formation boundary 62 between a high-gamma-emitting region 64 and a low-gamma-emitting region 60. As used herein, the terms "high-gamma-emitting region" and "low-gamma-emitting region" are relative terms used to describe the gamma emissions from the two regions 64 and 60 relative to one another, and are not used to indicate a particular gamma emission intensity or range of intensities. In certain embodiments, the operational block 130 includes calculating a gamma gradient (GG) indicative of the distance of the tool 10 from the formation boundary 62. For example, the geometric approximation as described herein in conjunction with FIGS. 7A-7D can be used. The plurality of gamma ray detectors 40 can have a maximum gamma ray detection value (e.g., the gamma ray detection level that is greater than the other gamma ray detection levels of the plurality of gamma ray detectors 40) and a minimum gamma ray detection value (e.g., the gamma ray detection level that is less than the other gamma ray detection levels of the plurality of gamma ray detectors 40). The gamma gradient (GG) can be calculated in various ways in accordance with various embodiments described herein. For example, GG can be expressed as a dimensionless ratio $GG=G_{large}/G_{small}$, where $G_{large}$ is the maximum gamma ray detection values and $G_{small}$ is the minimum gamma ray detection values. For another example, GG can be expressed as one of the following dimensionless ratios: $GG=(G_{large}-G_{small})/G_{small}$, or $GG=(G_{large}-G_{small})/G_{ave}$, or $GG=(G_{large}-G_{small})/G_{total}$, where $G_{ave}$ is the average of the gamma ray detection levels $G_n$ from the detectors 40, and where $G_{total}$ is the sum of the gamma ray detection levels $G_n$ from the detectors 40.

In certain embodiments, the method 100 further comprises using the calculated values to steer a wellbore drilling tool as it drills the wellbore 30. In certain embodiments in which the wellbore survey tool 10 is used to survey the wellbore 30 non-concurrently with drilling the wellbore 30 (e.g., the wellbore survey tool 10 is separate from a wellbore drill string), the method 100 comprises using the calculated information to selectively steer the wellbore drill string in a desired direction once drilling re-commences. In certain other embodiments in which the wellbore survey tool 10 is part of a wellbore drill string, the method 100 comprises using the calculated information to selectively steer the wellbore drill string in a desired direction while drilling.

Figure 9C:
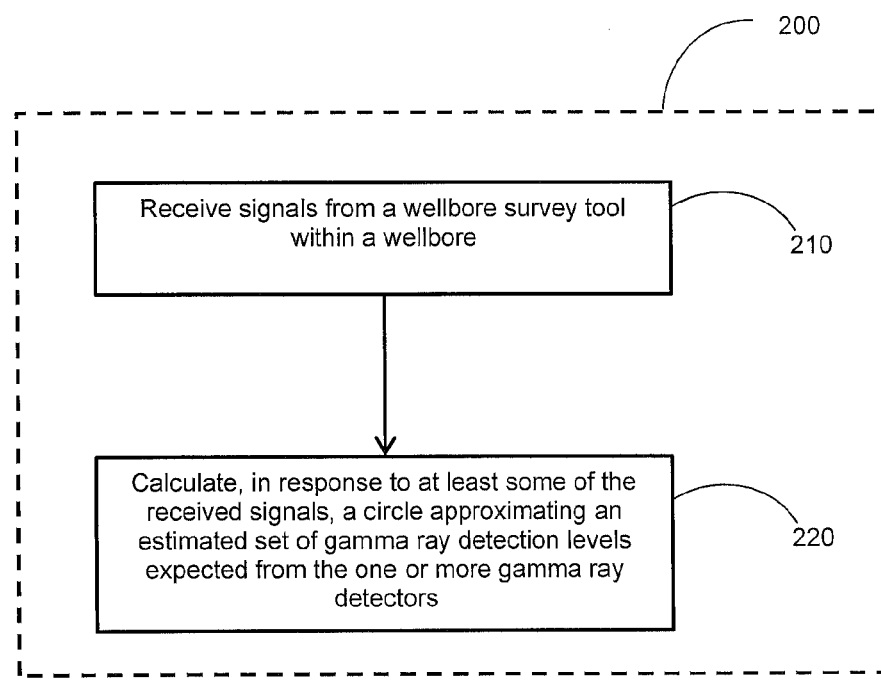
FIG. 9C is a flow diagram of an example of a method utilizing one or more gamma ray detectors in accordance with certain embodiments described herein.

FIG. 9C is a flow diagram of an example of a method 200 utilizing one or more gamma ray detectors 40 in accordance with certain embodiments described herein. In an operational block 210, the method 200 comprises receiving signals from a wellbore survey tool 10 within a wellbore 30. The tool 10 comprises a center axis 22 and one or more gamma ray detectors 40. Each detector 40 of the one or more gamma ray detectors 40 has a direction 42 of maximum gamma ray sensitivity with the direction 42 having a non-zero component 44 perpendicular to the center axis 22. In certain embodiments in which the one or more gamma ray detectors 40 comprises a plurality of gamma ray detectors 40, the non-zero components 44 of the plurality of gamma ray detectors 40 are spaced circumferentially about the center axis 22. The signals from the one or more gamma ray detectors 40 are indicative of a gamma ray detection level of each detector 40. In an operational block 220, the method 200 further comprises calculating, in response to at least some of the received signals, a circle approximating an estimated set of gamma ray detection levels expected from the one or more gamma ray detectors 40 during a hypothetical rotation of the tool 10 about the center axis 22 while the tool 10 is substantially stationary in a direction along the wellbore 30.

In certain embodiments, the one or more gamma ray detectors 40 can comprise three or more gamma ray detectors 40, and the circle can be defined by the three or more gamma ray detection vectors. In certain other embodiments, the one or more gamma ray detectors 40 can comprise a single gamma ray detector 40 and at least a portion of the tool 10 (e.g., the body 20) can be rotated while the tool 10 is substantially stationary in a direction along the wellbore 30 such that the single gamma ray detector 40 has its non-zero component pointing along three or more different angular directions spaced circumferentially (e.g., spaced equally circumferentially) from one another around the center axis 22. The circle can be defined by the three or more gamma ray detection vectors corresponding to the signals from the single gamma ray detector 40 at the three or more different angular directions.

As described herein in conjunction with FIGS. 7A-7D, the circle has a radius R and a center that is offset from the common origin by a distance O along an offset direction. A sum of the radius R and the distance O is an estimate of $G_{max}$ (e.g., $G_{max}=R+O$) during the rotation. A difference of the radius R minus the distance O is an estimate of $G_{min}$ (e.g., $G_{min}=R-O$) during the rotation. The gamma direction 66 (e.g., a direction of highest gamma ray intensity of the detected gamma ray distribution) is estimated by the offset direction (e.g., extending from $P_1$ and through the center $P_2$ of the circle). An angle between the offset direction and a gamma ray detection vector is an estimate of an azimuth gamma angle of the corresponding gamma ray detector. A ratio of the distance O divided by the radius R provides an estimate of an anisotropy of the gamma ray distribution, with a value of zero corresponding to a homogeneous gamma ray distribution and a value of one corresponding to a theoretical gamma source emitting from only a single direction and perfect shielding of the detectors 40 to only allow detection of gamma rays when oriented with its direction of maximum gamma ray sensitivity along the emission direction.

In certain embodiments, the method 200 further comprises using the calculated values to steer a wellbore drilling tool as it drills the wellbore 30. In certain embodiments in which the wellbore survey tool 10 is used to survey the wellbore 30 non-concurrently with drilling the wellbore 30 (e.g., the wellbore survey tool 10 is separate from a wellbore drill string), the method 200 comprises using the calculated information to selectively steer the wellbore drill string in a desired direction once drilling re-commences. In certain other embodiments in which the wellbore survey tool 10 is part of a wellbore drill string, the method 200 comprises using the calculated information to selectively steer the wellbore drill string in a desired direction while drilling. In certain embodiments, the steering can be performed after interpretation of the gamma information that is collected downhole and then sent to and processed at the surface. In certain such embodiments, directional commands can be sent back to the downhole steering tool to adjust its trajectory. In certain other embodiments, an intelligent system within the downhole tool can directly interpret the gamma data collected and make its own steering decisions to adjust the wellbore position, e.g., based on optimizing the gamma sensor response to the surrounding formation. For example, in certain embodiments, the steering can be controlled so as to maintain a maximum or minimum average gamma level or a maximum or minimum average gamma gradient (e.g., as an indication of proximity to a formation boundary) or to control directional changes in line with calculated azimuthal gamma angles, e.g., by adjusting the borehole vertical position.

In addition, as well as gamma information alone, certain embodiments described herein, can guide the system using a blend of gamma information and directional information, e.g., to enhance the overall trajectory performance. The directional information can be provided by a magnetometer/accelerometer package, by a gyroscope/accelerometer package, or a blend of data from both types of packages.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the methods described herein can be performed in a different sequence, can be added, merged, or left out completely (e.g., not all described acts or events are necessary for the practice of the method). Moreover, in certain embodiments, acts or events can be performed concurrently, e.g., through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of computer-readable storage medium known in the art. An exemplary tangible, computer-readable storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A wellbore survey tool comprising:
 a body having a center axis, the body configured to be placed within a wellbore; and
 a plurality of gamma ray detectors within the body, each detector of the plurality of gamma ray detectors having a direction of maximum gamma ray sensitivity with the direction having a non-zero component perpendicular to the center axis, the non-zero components of the plurality of gamma ray detectors spaced circumferentially about the center axis;
 wherein the controller is further configured to calculate an estimated gamma direction by comparing the gamma ray detection levels of the plurality of gamma ray detectors to one another.

2. The tool of claim 1, wherein each detector of the plurality of gamma ray detectors is responsive to gamma rays having a range of energies, the ranges of the detectors substantially similar to one another.

3. The tool of claim 1, wherein the non-zero components of the plurality of gamma ray detectors are generally equally spaced circumferentially about the center axis.

4. The tool of claim 1, wherein the plurality of gamma ray detectors are within a portion of the body that is configured to rotate about the center axis with a rotation rate during operation of the tool within the wellbore.

5. The tool of claim 4, wherein the rotation rate is less than 36 degrees per minute.

6. The tool of claim 1, wherein the plurality of gamma ray detectors comprises three detectors, the non-zero components of the three detectors spaced circumferentially about the center axis by 120 degrees from one another.

7. The tool of claim 1, wherein the non-zero components are coplanar with one another.

8. The tool of claim 1, wherein at least one of the non-zero components is not coplanar with one or more of the other non-zero components.

9. The tool of claim 1, wherein each detector of the plurality of gamma ray detectors is offset from the center axis.

10. The tool of claim 1, further comprising a controller configured to receive signals from the plurality of gamma ray detectors, the signals indicative of a gamma ray detection level of each detector of the plurality of gamma ray detectors.

11. The tool of claim 10, wherein the controller is further configured to calculate a local gamma level in response to the signals from the plurality of gamma ray detectors.

12. The tool of claim 1, further comprising at least one directional sensor within the body, the at least one directional sensor configured to provide information to the controller regarding an orientation of the body relative to a vertical direction.

13. A wellbore survey tool comprising:
a body having a center axis, the body configured to be placed within a wellbore; and
a plurality of gamma ray detectors within the body, each detector of the plurality of gamma ray detectors having a direction of maximum gamma ray sensitivity with the direction having a non-zero component perpendicular to the center axis, the non-zero components of the plurality of gamma ray detectors spaced circumferentially about the center axis;
wherein the controller is further configured to calculate a local gamma level in response to the signals from the plurality of gamma ray detectors;
wherein the local gamma level is proportional to an average of the gamma ray detection levels of the plurality of gamma ray detectors.

14. A wellbore survey tool comprising:
a body having a center axis, the body configured to be placed within a wellbore; and
a plurality of gamma ray detectors within the body, each detector of the plurality of gamma ray detectors having a direction of maximum gamma ray sensitivity with the direction having a non-zero component perpendicular to the center axis, the non-zero components of the plurality of gamma ray detectors spaced circumferentially about the center axis;
wherein the controller is further configured to calculate a local gamma level in response to the signals from the plurality of gamma ray detectors;
wherein the local gamma level is proportional to a sum of the gamma ray detection levels of the plurality of gamma ray detectors.

* * * * *